(12) United States Patent
Breaux et al.

(10) Patent No.: US 11,898,941 B2
(45) Date of Patent: Feb. 13, 2024

(54) PIPE ENGAGEMENT AND TESTING SYSTEM

(71) Applicant: Pipeline Pressure Isolation Group, LLC, Cypress, TX (US)

(72) Inventors: Kenneth Breaux, Houston, TX (US); W. Scott Buckley, Katy, TX (US)

(73) Assignee: Pipeline Pressure Isolation Group, LLC, Cypress, TX (US)

( * ) Notice: Subject to any disclaimer, the term of this patent is extended or adjusted under 35 U.S.C. 154(b) by 29 days.

(21) Appl. No.: 17/545,285

(22) Filed: Dec. 8, 2021

(65) Prior Publication Data

US 2022/0099520 A1 Mar. 31, 2022

Related U.S. Application Data

(63) Continuation-in-part of application No. 15/586,391, filed on May 4, 2017, now abandoned.

(60) Provisional application No. 62/332,394, filed on May 5, 2016, provisional application No. 62/332,392, filed on May 5, 2016.

(51) Int. Cl.
| | |
|---|---|
| *F16L 55/10* | (2006.01) |
| *G01M 3/28* | (2006.01) |
| *F16L 55/132* | (2006.01) |
| *F16L 55/128* | (2006.01) |

(52) U.S. Cl.
CPC ....... *G01M 3/2823* (2013.01); *F16L 55/1283* (2013.01); *F16L 55/132* (2013.01)

(58) Field of Classification Search
CPC ...... F16L 27/04; F16L 55/1283; F16L 55/124

USPC ...................................................... 138/89, 90
See application file for complete search history.

(56) References Cited

U.S. PATENT DOCUMENTS

| | | | |
|---|---|---|---|
| 2,061,289 A * | 11/1936 | Phipps | E21B 33/1294 |
| | | | 417/189 |
| 2,184,634 A | 12/1939 | Crickmer | |
| 2,329,801 A | 9/1943 | Wellborn | |
| 2,738,017 A | 3/1956 | Lynes | |
| 2,934,361 A | 4/1960 | Young | |
| 3,107,696 A * | 10/1963 | Ver Nooy | F16L 55/1283 |
| | | | 166/120 |
| 3,171,661 A | 3/1965 | Blair | |
| 3,285,343 A | 11/1966 | Urbanosky | |
| 3,323,551 A | 6/1967 | Bell | |
| 3,789,684 A | 1/1974 | Wiers et al. | |
| 3,837,214 A | 9/1974 | Guest | |
| 3,886,977 A | 6/1975 | Dorgebray | |
| 4,040,650 A * | 8/1977 | Shotbolt | F16L 27/04 |
| | | | 285/912 |
| 4,381,800 A | 5/1983 | Leslie | |
| 4,385,643 A | 5/1983 | Noe | |
| 4,422,477 A | 12/1983 | Wittman et al. | |
| 4,465,104 A | 8/1984 | Wittman | |
| 4,498,811 A * | 2/1985 | Fern | F16L 1/20 |
| | | | 405/173 |
| 4,760,868 A | 8/1988 | Saxon | |
| 4,852,391 A | 8/1989 | Ruch et al. | |
| 5,293,905 A | 3/1994 | Friedrich | |

(Continued)

*Primary Examiner* — James F Hook
(74) *Attorney, Agent, or Firm* — Stephens Juren, PLLC; Matthew C. Juren; Kelly D. Stephens

(57) ABSTRACT

A packer ring and activation system for use in a pipeline pressure isolation system utilizing a packer, a packer support ring, a primary wedge, and a plurality of secondary wedges for use with a pipe engagement, sealing and testing system.

11 Claims, 23 Drawing Sheets

(56) References Cited

U.S. PATENT DOCUMENTS

| | | | |
|---|---|---|---|
| 5,419,184 A | 5/1995 | Pace | |
| 5,438,862 A | 8/1995 | Keating et al. | |
| 5,701,959 A | 12/1997 | Hushbeck | |
| 5,797,431 A | 8/1998 | Adams | |
| 5,924,545 A | 7/1999 | Dyck et al. | |
| 6,339,953 B1 | 1/2002 | Ashworth | |
| 6,450,104 B1 | 9/2002 | Grant et al. | |
| 6,601,437 B2 | 8/2003 | Gotowik | |
| 6,752,175 B1 | 6/2004 | Willschuetz | |
| 7,124,779 B2 | 10/2006 | Syse | |
| 7,475,591 B2 | 1/2009 | Buckley et al. | |
| 7,568,504 B2 | 8/2009 | Syse et al. | |
| 7,878,221 B2 | 2/2011 | Aleksandersen et al. | |
| 8,042,574 B2 | 10/2011 | Mellemstrand et al. | |
| 8,171,960 B2 | 5/2012 | Syse et al. | |
| 8,197,611 B2 | 6/2012 | Strohmeier et al. | |
| 8,256,270 B2 | 9/2012 | Fielding et al. | |
| 9,169,956 B2 | 10/2015 | Bowie | |
| 9,400,076 B2 | 7/2016 | Early et al. | |
| 9,664,588 B2 | 5/2017 | Kotlyar | |
| 2002/0043368 A1 | 4/2002 | Bell | |
| 2002/0101040 A1 | 8/2002 | Russell | |
| 2005/0224147 A1 | 11/2005 | Syse | |
| 2005/0241710 A1 | 11/2005 | Early et al. | |
| 2006/0064829 A1 | 3/2006 | Houldey et al. | |
| 2007/0023096 A1 | 2/2007 | Buckley et al. | |
| 2007/0113622 A1 | 5/2007 | Buckley et al. | |
| 2010/0051130 A1 | 3/2010 | Syse et al. | |
| 2010/0133865 A1 | 6/2010 | Syse | |
| 2010/0313985 A1 | 12/2010 | Bowie | |
| 2013/0199651 A1 | 8/2013 | Bowie | |
| 2014/0238700 A1* | 8/2014 | Williamson | E21B 33/129 166/387 |
| 2018/0216429 A1* | 8/2018 | Dockweiler | E21B 23/01 |

\* cited by examiner

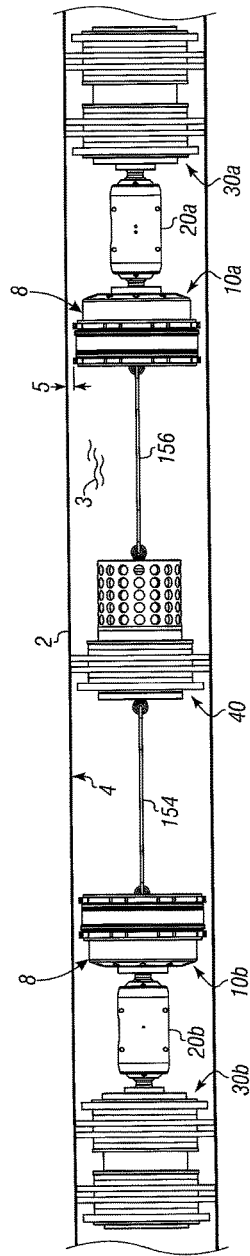
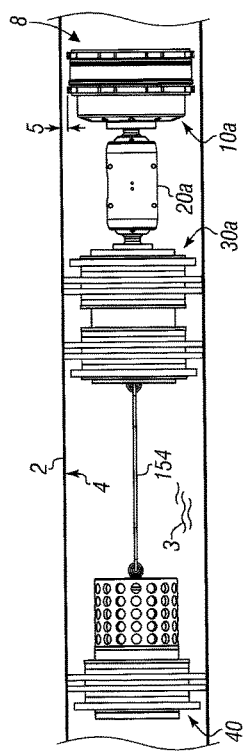
FIGURE 1A
FIGURE 1B

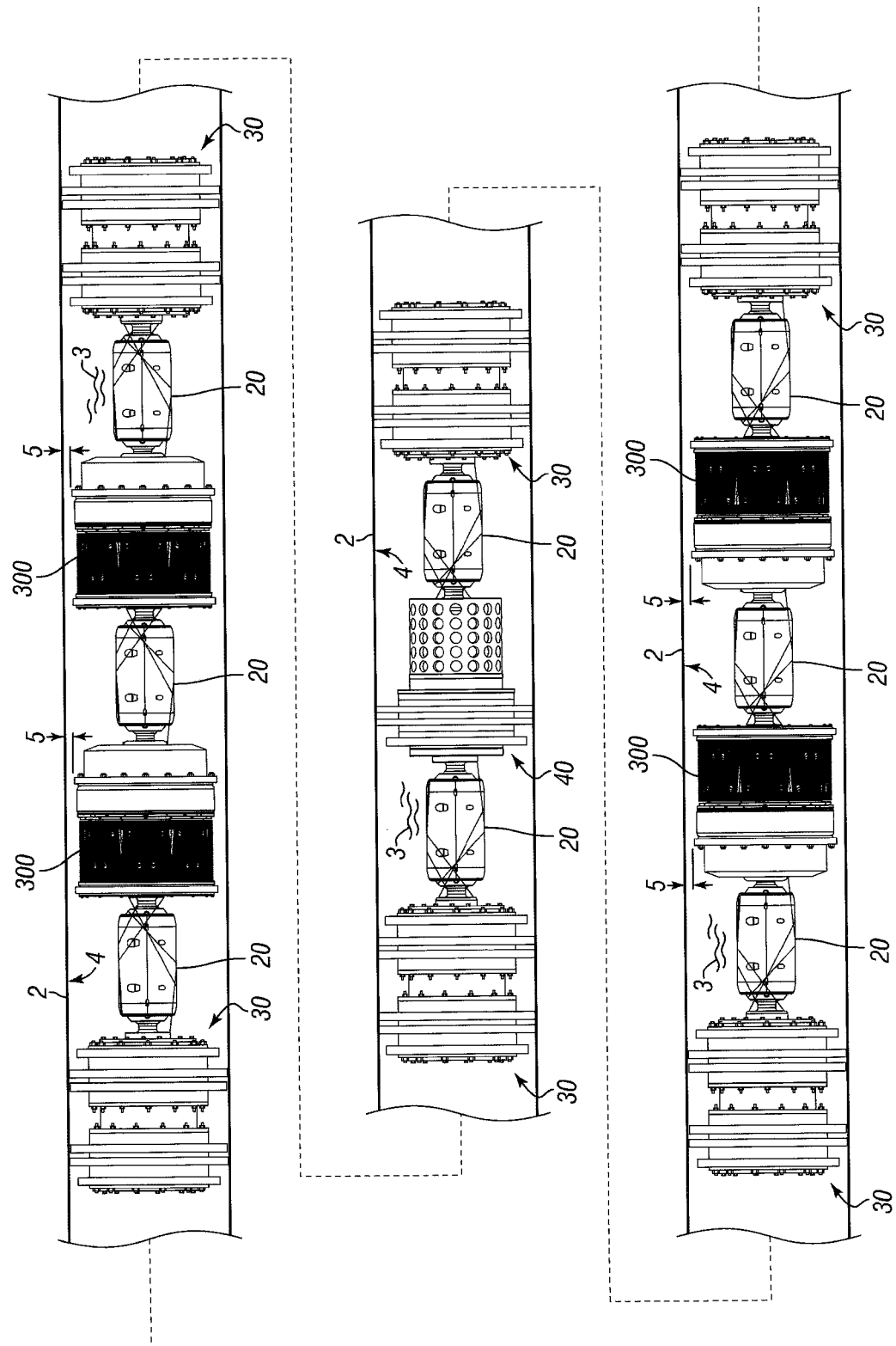

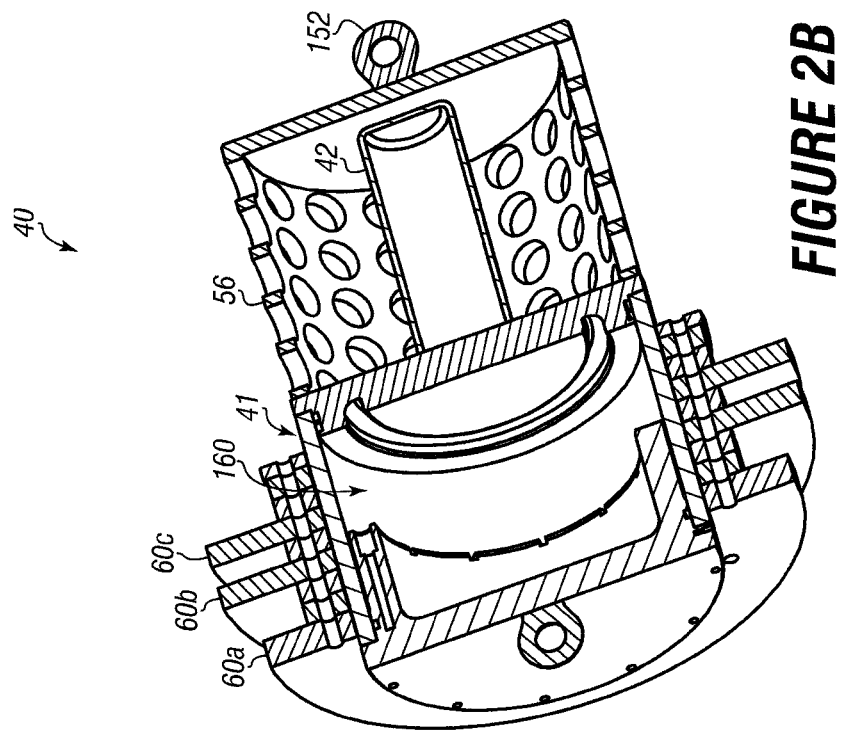
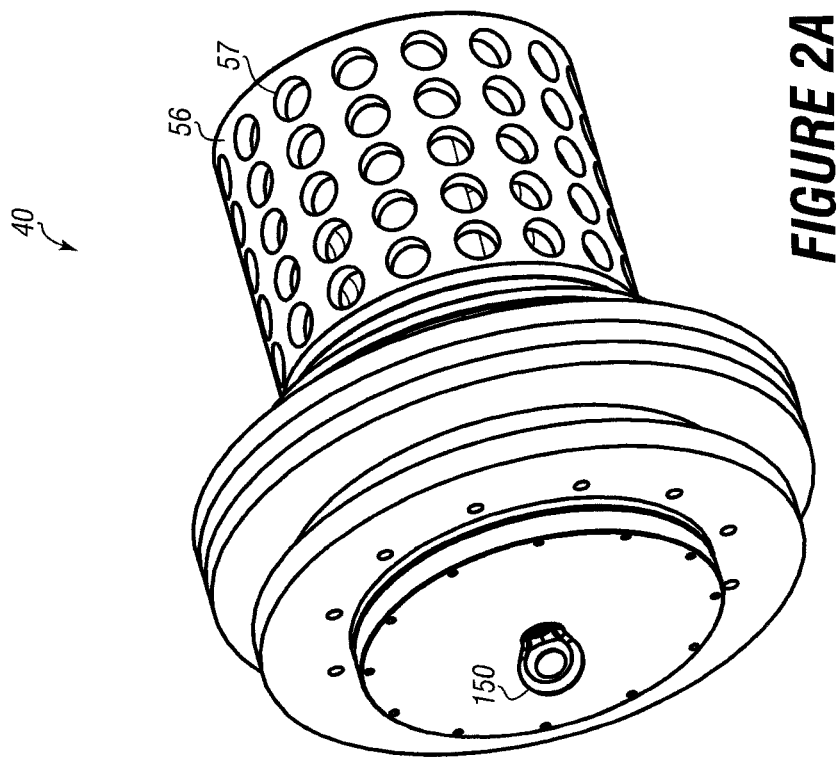

- 101 HYDROTESTING MODULE DATA STORAGE
- 102 COMPUTER INSTRUCTIONS TO INSTRUCT THE HYDROTESTING MODULE PROCESSOR TO RECORD AND TRANSMIT DETECTED PIPELINE PRESSURES FROM SENSORS CONNECTED TO THE HYDROTESTING MODULE PROCESSOR TO A NETWORK
- 104 COMPUTER INSTRUCTIONS TO INSTRUCT THE HYDROTESTING MODULE PROCESSOR TO PROVIDE COMMANDS TO OPEN AND CLOSE A VALVE CONNECTED BETWEEN THE PRESSURIZED GAS RESERVOIR AND THE INFLATABLE BELLOWS BASED ON PRESET PRESSURES STORED IN THE HYDROTESTING MODULE DATA STORAGE
- 106 PRESET PRESSURES
- 108 COMPUTER INSTRUCTIONS TO INSTRUCT THE HYDROTESTING MODULE PROCESSOR TO AUTOMATICALLY (I) INCREASE PRESSURE IN A PIPELINE AT A FIRST SEGMENT, (II) TEST INTEGRITY OF THE PIPELINE AT A FIRST SEGMENT, AND (III) DECREASE PRESSURE IN A PIPELINE FIRST SEGMENT (IV) AFTER TESTING INTEGRITY OF THE PIPELINE AT A FIRST SEGMENT MOVE DOWN A PIPELINE TO INCREASE PRESSURE AND TEST INTEGRITY OF THE PIPELINE AT A SECOND SEGMENT WITHOUT HAVING TO PULL OUT THE INLINE HYDROTESTING MODULE FROM THE PIPELINE
- 112 COMPUTER INSTRUCTIONS TO INSTRUCT THE HYDROTESTING MODULE PROCESSOR TO RECORD AND TRANSMIT DETECTED PIPELINE TEMPERATURES FROM SENSORS CONNECTED TO THE PROCESSOR TO A NETWORK

*FIGURE 2D*

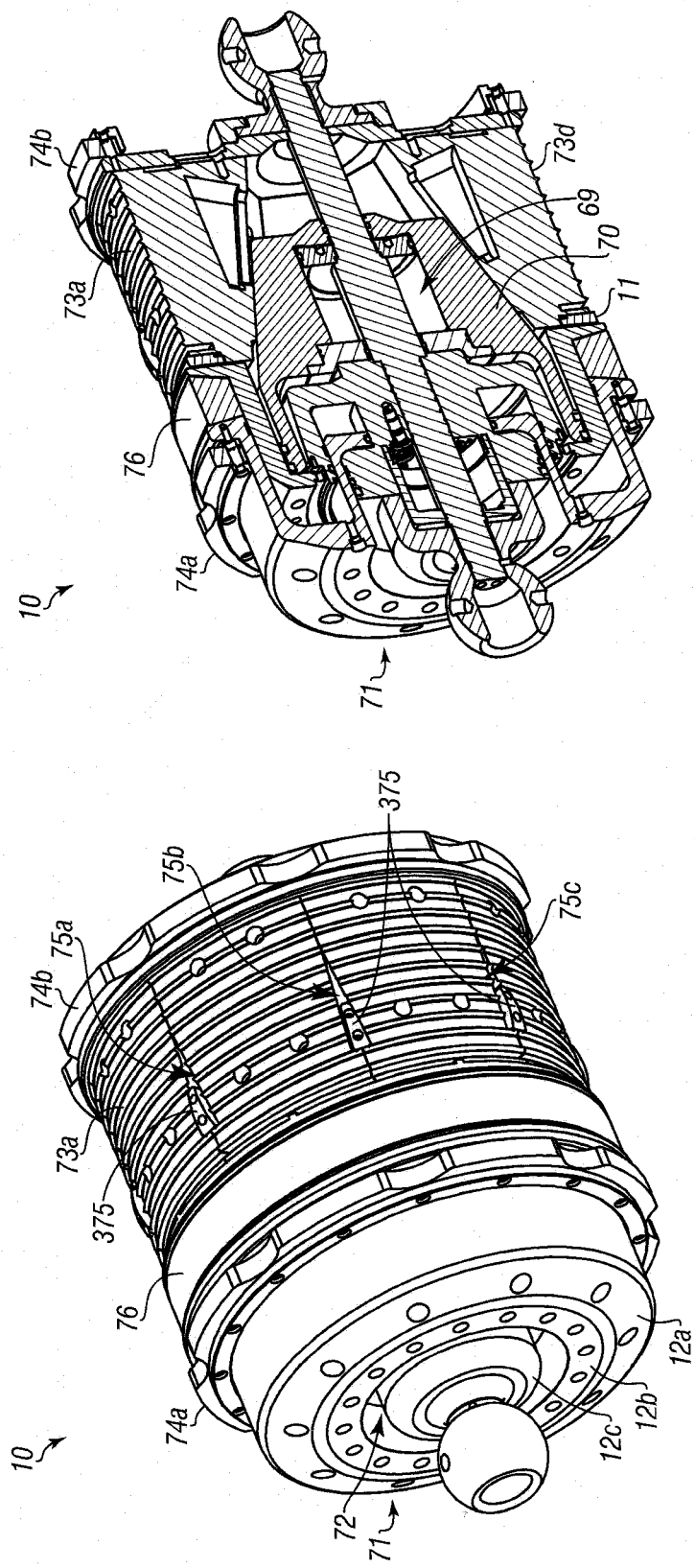

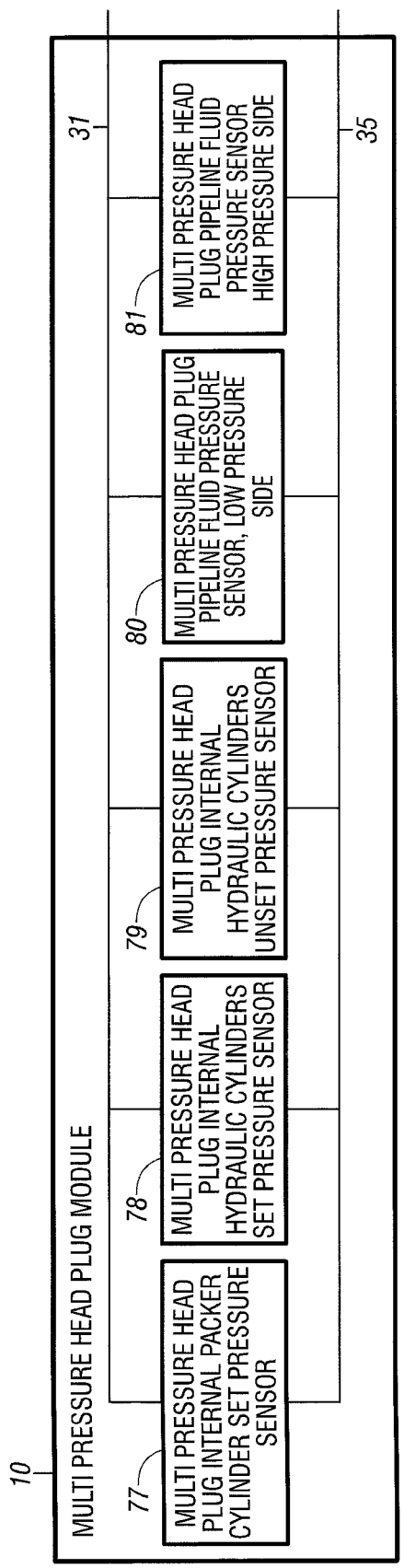
FIGURE 3C
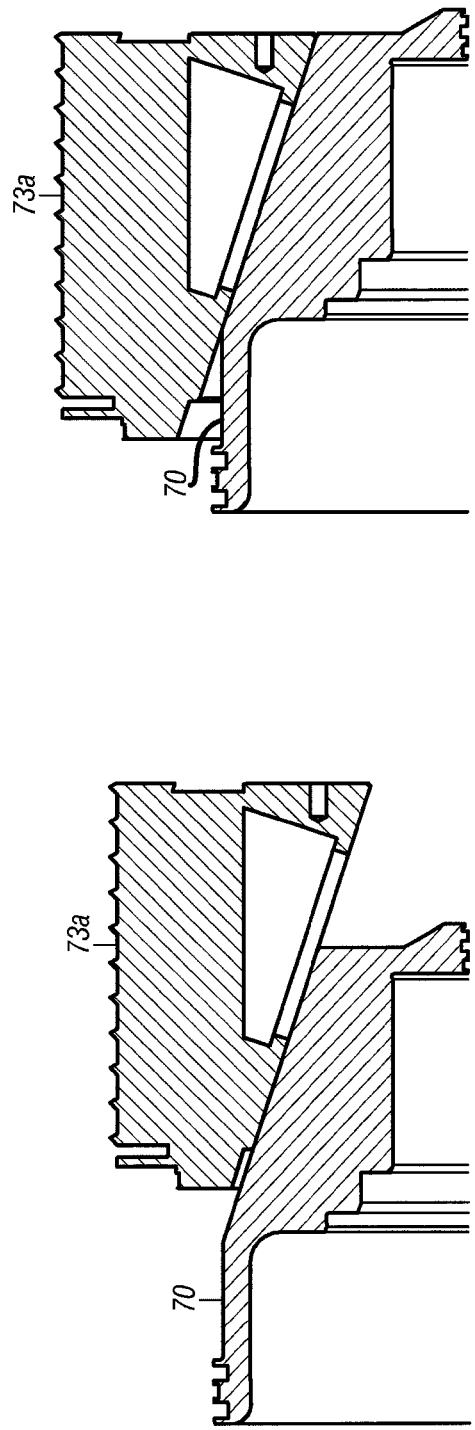
FIGURE 4B
FIGURE 4A

| |
|---|
| CONTROL MODULE DATA STORAGE —207 |
| COMPUTER INSTRUCTIONS CONFIGURED TO INSTRUCT THE CONTROL MODULE PROCESSOR TO PROVIDE CONTROLLED PRESSURE TO ACTIVATE THE PACKER SEAL OF THE MULTIPRESSURE HEAD PLUG MODULE —302 |
| PRESET PUMP PRESSURES —303 |
| COMPUTER INSTRUCTIONS CONFIGURED TO INSTRUCT THE CONTROL MODULE PROCESSOR TO PROVIDE CONTROLLED PRESSURE TO ACTIVATE THE RADIALLY EXPANDING GRIPS OF THE MULTIPRESSURE HEAD PLUG MODULE —304 |
| PRESET PIPELINE FLUID TEMPERATURES —305 |
| PRESET PIPELINE FLUID PRESSURES —307 |
| COMPUTER INSTRUCTIONS CONFIGURED TO INSTRUCT THE CONTROL MODULE PROCESSOR TO PROVIDE A SIGNAL TO THE CONTROL MODULE VALVE TO PRESSURIZE A PRESSURE CHAMBER IN THE MULTIPRESSURE HEAD PLUG MODULE TO EXPAND THE PACKER SUPPORT RING —310 |
| COMPUTER INSTRUCTIONS CONFIGURED TO INSTRUCT THE CONTROL MODULE PROCESSOR TO COMPARE DETECTED PUMP FLUID OUTPUT PRESSURES TO PRESET PUMP PRESSURES AND PROVIDE A MESSAGE TO A CLIENT DEVICE AND ENABLING MODIFICATION OF PUMPING WHEN THE DETECTED PUMP FLUID OUTPUT PRESSURE FALLS BELOW OR EXCEEDS THE PRESET PUMP PRESSURES —312 |

*FIGURE 5D*

PIPE ENGAGEMENT AND TESTING SYSTEM

CROSS-REFERENCE TO RELATED APPLICATIONS

This application claims priority to U.S. provisional and nonprovisional patent applications 62/332,392 filed May 5, 2016, 62/332,394 filed on May 5, 2016 and Ser. No. 15/586,391 filed May 4, 2017, which are all incorporated by reference herein in their entirety.

STATEMENT REGARDING FEDERALLY SPONSORED RESEARCH

Not applicable.

BACKGROUND

In several embodiments, the present invention generally relates to a pipe engagement, sealing and testing system.

A need exists for a pipeline pressure isolation system.

A need exists for a pipeline pressure isolation system that uses pipeline pressure to contribute to the gripping and sealing forces of the pressure isolation devices in a pipeline to isolate pressure in the pipeline.

A need also exists for a pipeline pressure isolation system that uses pipeline pressure to contribute to the gripping and sealing forces of the pressure isolation devices in pipeline that are used to verify integrity of the pipeline.

A need exists for a module to be used in a pipeline with pipeline fluid for verifying integrity of the pipeline.

A need exists for a staggered gripping wedge mechanism to be used with wedges on a pipeline module.

A need exists for an expansion ring with rigid inserts to prevent pinching and to close excess extrusion gaps near a pipeline isolation packer.

The present invention is distinguishable from the following pieces of art viewed individually, or in conjunction:

| U.S. Pat. Nos. | | | | | |
|---|---|---|---|---|---|
| 3,789,684 | 3,837,214 | 4,422,477 | 4,852,391 | 5,293,905 | 5,419,184 |
| 5,438,862 | 5,924,545 | 6,339,953 | 6,450,104 | 6,601,437 | 6,752,175 |
| 7,475,591 | 7,878,221 | 8,042,574 | 8,197,611 | 8,256,270 | 9,169,956 |
| 9,400,076 | 7,124,779 | 8,171,960 | 7,568,504 | 2,329,801 | 2,738,017 |
| 2,934,361 | 3,323,551 | 3,886,977 | 4,381,800 | 4,385,643 | 4,760,868 |
| 5,701,959 | 5,797,431 | 9,664,588 | 2,184,634 | 3,171,661 | 3,285,343 |
| 4,465,104 | | | | | |

| U.S. Patent Application Publication Numbers- | | | |
|---|---|---|---|
| 20020101040 | 20050224147 | 20050241710 | 20060064829 |
| 20070113622 | 20070023096 | 20100051130 | |
| 20100133865 | 20100313985 | 20130199651 | |

SUMMARY

In some embodiments, the invention can be for a pipeline pressure isolation system used in a pipeline with pipeline fluid.

In some embodiments, the pipeline pressure isolation system uses a packer support ring to support the packer at the extrusion gaps or other unsupported zones.

In some embodiments, the pipeline pressure isolation system can have a multi pressure head plug module disposed in the pipeline forming an extrusion gap between the multi pressure head plug module and an inner surface of the pipeline.

In some embodiments, the multi pressure head plug module can have a plurality of support disks mounted around a portion of the plug body and a packer seal secured around a portion of the plug body.

In some embodiments, the pipeline pressure isolation system can include a ball joint assembly connected to the multi pressure head plug module disposed in the pipeline.

In some embodiments, the pipeline pressure isolation system can include a ball joint assembly to connect various modules of the system.

In some embodiments, the pipeline pressure isolation system comprises a staggered gripping wedge.

In some embodiments, the ball joint assembly can include a ball joint clamshell housing having a chamber, a first pivoting ball joint having a first ball joint interior conduit mounted on one end of the ball joint clamshell housing and a second pivoting ball joint with a second ball joint interior conduit mounted on an opposite end of the ball joint clamshell housing. The first and second ball joint interior conduits are in fluid communication with the chamber.

In some embodiments, the pipeline pressure isolation system can be a multi pressure head plug module disposed in a pipeline with pipeline fluid. The multi pressure head plug module can have a plug body having multiple pressure heads, a plurality of support disks mounted around a portion of the plug body, a plurality of grips mounted around a portion of the plug body.

In some embodiments, the multi pressure head can have sliders mounted around a portion of the plug body, extending beyond the grips to prevent them from contacting the pipe wall when the grips are in an inactivated position.

In some embodiments, an hydrotesting module can be installed in a pipeline with pipeline fluid for testing integrity of a pipeline. The hydrotesting module can have a body with an inflatable bellows connected to and extending from the body. The hydrotesting module can have a pressurized gas reservoir fluidly connected to the inflatable bellows and a valve fluidly connected between the pressurized gas reservoir and the inflatable bellows.

In some embodiments, the hydrotesting module can have a power supply in the body connected to the hydrotesting module processor and a pipeline fluid pressure sensor measuring pipeline fluid pressure and transmitting measured pressure to the hydrotesting module processor for performing calculations to change hydrotesting functions.

In some embodiments, the hydrotesting module processor can connect with a hydrotesting module data storage contained in the body. The hydrotesting module data storage can contain computer instructions to instruct the processor to record detected pipeline fluid pressures from the pipeline fluid pressure sensor and computer instructions to instruct the processor to provide commands to open and close a valve based on a preset pressure stored in the data storage for pipeline fluid.

In some embodiments, the hydrotesting module can be configured to perform at least one of: (i) increase pressure in a pipeline at a first segment, (ii) test integrity of the pipeline at a segment, and (iii) decrease pressure in a pipeline in the segment. In some embodiments, the present invention relates to an hydrotesting module installed in a pipeline for testing the integrity of the pipeline and connections in the pipeline.

In some embodiments, the hydrotesting module can have a power supply in the body connected to a hydrotesting module processor. The hydrotesting module processor can communicate with a hydrotesting data storage.

In some embodiments, the hydrotesting module can have a pipeline fluid pressure sensor for measuring pipeline fluid pressure and transmitting measured pressure to the hydrotesting module processor for performing calculations to change hydrotesting functions.

In some embodiments, the hydrotesting module data storage can contain computer instructions to instruct the hydrotesting module processor to record detected pipeline fluid pressures from the pipeline fluid pressure sensor, and computer instructions to instruct the hydrotesting module processor to provide commands to open and close a valve based on a preset pressure stored in the hydrotesting module data storage for pipeline fluid.

In some embodiments, the hydrotesting module has all data gathering, storage and processing located outside of the module.

In some embodiments, the hydrotesting module inflatable bellows can be replaced by either a pneumatic piston connected to the gas reservoir or a variable volume canister. The hydrotesting module inflatable bellows can be made of at least one of: an expandable rubber, a synthetic balloon shaped elastomeric material, expanding packer material, and a metallic expandable material. In some embodiments, the hydrotesting module inflatable bellow can be replaced by either a hydraulic bellows, or a hydraulic piston.

In some embodiments, the inventive system is used in a multi pressure head pipeline isolation plug. This invention facilitates the creation of a "short" plug by enabling the radial "stacking" of activation interfaces. Stacking of activation interfaces may result in a device with multiple modes of instability. In some embodiments, the present inventive system is flexible in that it activates based on encountering the pipe interior wall. In many embodiments of the invention, the system does not have to be specifically tuned for each expected pipe diameter. In some embodiments, the present invention may reduce one or more modes of instability upon activation. In some embodiments, the present invention may utilize one or more modes of instability to reach a locally stable arrangement.

In some embodiments of the present invention, a primary wedge is set by a hydraulic cylinder. Due to the substantially wedged faces on its outer surface this linear movement is translated into a radial force which deploys secondary wedges outwards towards the pipeline interior diameter. The grip units make contact with the pipe interior surface. Grip units have teeth on their outer surface which grip the pipeline interior surface. The greater the radial force, the greater the gripping force of the grip units.

In some embodiments, there are two movable/sliding interfaces involved in achieving the grip function. The interface between the primary wedge and secondary wedge is a first interface. The plurality of interface surfaces between the secondary wedges and the grip units are collectively referred to as a second interface. In some embodiments, these interfaces generally are at a parallel angle. In some embodiments, the interface between the primary wedge and the secondary wedge may be a plurality of interface surfaces.

In some embodiments, the present invention is a pipe engagement system, comprising:

a multi pressure head plug module, the multi pressure head plug module comprising: a plug body having a multi pressure section face, the pipeline fluid applying a pipeline fluid differential pressure against the multi pressure section face; a plurality of support disks mounted around a portion of the plug body; and a packer seal secured around a portion of the plug body adjacent the support disks; a ball joint assembly mechanically connected to the multi pressure head plug module disposed in the pipeline, the ball joint assembly comprising; a ball joint housing having a chamber; a first pivoting ball joint having a first ball joint interior conduit mounted on one end of the ball joint housing; and a second pivoting ball joint with a second ball joint interior conduit mounted on an opposite end of the ball joint housing, wherein the first and the second ball joint interior conduit are in fluid communication via the chamber.

In some embodiments, the present invention is a method for operating a pipe engagement system comprising the steps of: pressurizing hydraulic fluid sent from the control module to hydraulic cylinder chamber to actuate relative movement of piston; actuating said piston to cause movement of a primary wedge; moving said primary wedge to interaction with secondary wedges; forcing secondary wedges to push outwardly; and engaging the grip units attached to said secondary wedges.

In some embodiments, the present invention pipe engagement system, comprising: a multi pressure head plug module, the multi pressure head plug module comprising: a plug body having a multi pressure section face, the pipeline fluid applying a pipeline fluid differential pressure against the multi pressure section face; and a packer seal secured around a portion of the plug body.

In some embodiments, the present invention is an hydrotesting module comprising: a body that can affect a volumetric change in a pipeline to increase or decrease the pressure in a pipeline segment.

In some embodiments, the present invention is a method for operating a pipe engagement system comprising the steps of: pressurized hydraulic fluid is sent from a control module to act on packer activation piston; actuating said piston to cause movement of the high-pressure packer ring and compress packer seal until it extends radially outward to engage a pipe wall.

In some embodiments, the present invention is a method for performing a hydrotest comprising the following steps: inserting a hydrotest module into a pipeline; transporting said hydrotest module into a test section of said pipeline; actuating said isolation plugs to seal off a segment of pipeline; said test section filled with a fluid; isolating said test section; activating said hydrotest module to enact a volumetric change in the pipeline to increase pressure in the pipeline.

In some embodiments, the present invention is a method for changing the pressure in a pipeline comprising the following steps: inserting a hydrotest module into a pipeline; transporting said hydrotest module into a test section of said pipeline; said test section filled with a fluid; isolating said test section; activating said hydrotest module to enact a volumetric change in the pipeline.

In some embodiments, the present invention is a pipe engagement system comprising: a packer; a packer support ring; a primary wedge; said primary wedge further comprising a plurality of planar angled faces and a pipe parallel face; a plurality of secondary wedges; said secondary wedges further comprising a primary wedge interface face and a grip unit interface face; said grip unit interface face further comprising a series of shallow and steep cut outs in a staggered tooth configuration; and said secondary wedges further comprising a pipe perpendicular face; a grip unit; said grip units further comprising a secondary wedge interface face and a tubular contact interface face; said secondary wedge interface further comprising a series of shallow and steep cut outs in a staggered tooth configuration; said tubular contact face further comprising a series of radial grips; a primary wedge insert with a staggered angle tooth configuration; a secondary wedge insert with a staggered angle tooth configuration; wherein said packer is in mechanical communication with said secondary wedges pipe perpendicular face; said primary wedge pipe angled face is in mechanical communication with said primary wedge insert; said primary wedge insert is in mechanical communication with said secondary wedge insert; said secondary wedge insert is in mechanical communication with said secondary wedge interface; and said secondary wedge grip unit interface face is in mechanical communication with said grip unit.

In some embodiments, the present invention is a pipe engagement system, comprising: a multi pressure head plug module, the multi pressure head plug module comprising: a plug body having a multi pressure section face, the pipeline fluid applying a pipeline fluid differential pressure against the multi pressure section face; a plurality of support features mounted around a portion of the plug body; and a packer seal secured around a portion of the plug body adjacent the support features; a ball joint assembly mechanically connected to the multi pressure head plug module disposed in the pipeline, the ball joint assembly comprising; a ball joint housing having a chamber; a first pivoting ball joint having a first ball joint interior conduit mounted on one end of the ball joint housing; and a second pivoting ball joint with a second ball joint interior conduit mounted on an opposite end of the ball joint housing, wherein the first and the second ball joint interior conduit are in fluid communication via the chamber.

In some embodiments, the present invention is an hydrotesting module comprising: a body; gas fluid intake; compressor; and a storage cylinder; said compressor designed to draw gas phase fluid from the pipeline and compress it into said storage cylinder.

In some embodiments, the present invention is a pipeline engagement system comprising: a packer; a packer support ring; a primary wedge; said primary wedge further comprising a plurality of planar angled faces and a pipe parallel face; a plurality of secondary wedges; said secondary wedges further comprising a primary wedge interface face and a grip unit interface face; said grip unit interface face further comprising a series of shallow and steep cut outs in a staggered tooth configuration; and said secondary wedges further comprising a pipe perpendicular face; a grip unit; said grip units further comprising a tubular contact interface face; said tubular contact face further comprising a series of radial grips; wherein said packer is in mechanical communication with said secondary wedges pipe perpendicular face; said primary wedge pipe angled face is in mechanical communication with said secondary wedge and secondary wedge is in mechanical communication with said grip unit.

In some embodiments, the present invention is a method for operating a pipe engagement system comprising the steps of: pressurizing hydraulic fluid sent from the control module to hydraulic cylinder chamber to actuate movement of piston; actuating said piston to cause movement of a primary wedge; moving said primary wedge to interact with secondary wedges; forcing secondary wedges to push outwardly.

In some embodiments, the present invention is a pipe engagement system comprising: a primary wedge; said primary wedge further comprising a plurality of planar angled faces and a pipe parallel face; a plurality of secondary wedges; said secondary wedges further comprising a primary wedge interface face and a grip unit interface face; said secondary wedges further comprising a pipe perpendicular face; a grip unit; said grip units further comprising a secondary wedge interface face and a tubular contact interface face; said tubular contact face further comprising a series of radial grips; a primary wedge insert with a staggered angle tooth configuration; a secondary wedge insert with a staggered angle tooth configuration; wherein said packer is in mechanical communication with said secondary wedges pipe perpendicular face; said primary wedge pipe angled face is in mechanical communication with said primary wedge insert; said primary wedge insert is in mechanical communication with said secondary wedge insert; said secondary wedge insert is in mechanical communication with said secondary wedge interface; and said secondary wedge grip unit interface face is in mechanical communication with said grip unit; said primary wedge insert and secondary wedge insert contact surfaces set at angles to promote crests of one insert to move into the knees of the mating staggered angle tooth inserts when said grip units contact a tubular such as the pipe wall such as to prevent further relative movement between said primary wedge insert and said secondary wedge insert.

In some embodiments, the present invention is a packer support ring configured to deploy, expand or extend radially toward the pipeline inner wall and partially or completely bridge both one or both of the plurality of extrusion gaps and/or a plurality of unsupported gaps.

In some embodiments, the present invention is a ball joint comprising a pivoting ball hemisphere slidingly engaging an inner pivoting ball joint adapter and slidingly engaging an exterior ball joint clamshell housing.

In some embodiments of the present invention, the packer ring and activation system utilizes a packer, a packer support ring, a primary wedge, a plurality of secondary wedges and a plurality of secondary wedge inserts.

In some embodiments of the present invention, the primary wedge further utilizes a plurality of pipe angled faces and a pipe parallel face.

In some embodiments of the present invention, the plurality of secondary wedges utilize a primary wedge interface and a grip unit, wherein the grip unit interface has a series of shallow and steep cut outs in a staggered tooth configuration; the secondary wedges further have a pipe perpendicular face, a plurality of grip units; these grip units utilize a secondary wedge interface and a tubular contact interface.

In some embodiments of the present invention the secondary wedge interface further contains a series of shallow and steep cut outs in a staggered tooth configuration with a tubular contact face with a series of radial grips;

In some embodiments of the present invention, the plurality of primary wedge inserts have a staggered angle tooth configuration;

In some embodiments of the present invention, a plurality of secondary wedge inserts with a staggered angle tooth configuration; wherein said packer is in mechanical communication with said secondary wedges pipe perpendicular face; said primary wedge pipe angled face is in mechanical communication with said primary wedge insert; said primary wedge insert is in mechanical communication with said secondary wedge insert; said secondary wedge insert is in mechanical communication with said secondary wedge interface; and said secondary wedge grip unit interface face is in mechanical communication with said grip unit.

In some embodiments of the present invention, the packer ring and activation system contain a packer support ring comprised of at least one segment of a relatively stiff material encapsulated in relatively less stiff material.

In some embodiments of the present invention, the packer ring and activation system utilizes a packer, a packer support ring, a primary wedge, a plurality of secondary wedges and a plurality of secondary wedge inserts.

In some embodiments of the present invention, the primary wedge further utilizes a plurality of pipe angled faces and a pipe parallel face.

In some embodiments of the present invention, the plurality of secondary wedges utilize a primary wedge interface with a grip unit, wherein the grip unit interface has a tubular contact face with a series of radial grips wherein the packer is in mechanical communication with the secondary wedges pipe perpendicular face, the primary wedge pipe angled face is in mechanical communication with the secondary wedge and the secondary wedge is in mechanical communication with the grip unit.

In some embodiments of the present invention, the packer ring and activation system contains a packer support ring comprised of at least one segment of a relatively stiff material encapsulated in a relatively less stiff material which is configured to deploy, expand or extend radially toward the inner wall of a pipeline and partially or completely bridge one or all of the plurality of extrusion gaps and/or a plurality of unsupported gaps between the plurality of the radially expanding grips.

In some embodiments of the present invention, the packer ring and activation system contains an activation system with a packer, a plurality of secondary wedges in mechanical communication with the packer support ring wherein the packer and packer support ring are expanded radially toward the pipeline inner wall by expansion of the secondary wedges.

In some embodiments of the present invention, the packer ring and activation system contains a plurality of primary wedges with inserts with staggered angle tooth configuration, a plurality of secondary wedges with inserts with staggered angle tooth configuration; wherein, the packer support ring is in mechanical communication with the secondary wedges, the primary wedge pipe angled face is in mechanical communication with the primary wedge insert, the primary wedge insert is in mechanical communication with the secondary wedge insert, and the secondary wedge insert is in mechanical communication with the secondary wedge interface; the secondary wedges further have a pipe perpendicular face and a plurality of grip units which utilize a secondary wedge interface and a tubular contact interface.

In some embodiments of the present invention, the packer ring and activation system contains a hydraulic cylinder which is pressurized to drive the primary wedges into sliding contact with the secondary wedges, expanding the packer support ring toward the pipeline inner wall.

In some embodiments of the present invention, the primary wedge insert and secondary wedge insert contact surfaces are set at angles to promote crests of one insert to move into the knee of the mating staggered angle tooth insert when the grip units contact a tubular such as the inner pipeline wall such as to prevent further relative movement between the primary wedge insert and the secondary wedge insert.

In some embodiments of the present invention, the packer ring and activation system contains a packer and a plurality of secondary wedges which are in mechanical communication with the packer support ring such that the packer support ring is expanded radially toward the pipeline inner wall by the expansion of the secondary wedges.

In some embodiments of the present invention, the packer ring and activation system contains a plurality of primary wedges with inserts with a staggered angle tooth configuration, a plurality of secondary wedges with inserts with a staggered angle tooth configuration; wherein the packer support ring is in mechanical communication with said secondary wedges, the primary wedge pipe angled face is in mechanical communication with the primary wedge insert, the primary wedge insert is in mechanical communication with the secondary wedge insert and the secondary wedge insert is in mechanical communication with the secondary wedge interface.

In some embodiments of the present invention, the packer and activation system utilizes a hydraulic cylinder; wherein, the hydraulic cylinder is pressurized to drive the primary wedges into sliding contact with the secondary wedges expanding the packer support ring toward the pipeline inner wall.

In some embodiments of the present invention, the packer ring and activation system contains primary wedge insert and secondary wedge insert contact surfaces set at angles to promote crests of one insert to move into the knees of the mating staggered tooth insert when the grip units contact a tubular such as the pipeline inner wall such as to prevent further relative movement between the primary wedge insert and the secondary wedge insert.

In some embodiments, the present invention is a packer ring and activation system utilizing a hydraulic cylinder; wherein the hydraulic cylinder is pressurized to drive the primary wedges into sliding contact with the secondary wedges and expanding the packer support ring toward said pipeline inner wall.

BRIEF DESCRIPTION OF THE DRAWINGS

The detailed description will be better understood in conjunction with the accompanying drawings as follows:

FIG. 1A depicts a deployed hydrotesting module connected to a pair of multi pressure head plug modules according to one or more embodiments.

FIG. 1B depicts a deployed hydrotesting module connected to a multi pressure head plug module according to one or more embodiments.

FIG. 1E depicts one embodiment of a deployed hydrotesting module connected to one or more pigging modules as utilized with one or more pipeline pressure isolation systems.

FIG. 2A depicts a perspective view of an hydrotesting module according to one or more embodiments.

FIG. 2B depicts a cut view of an hydrotesting module according to one or more embodiments.

FIG. 2D depicts a diagram of an hydrotesting module data storage according to one or more embodiments.

FIG. 3A depicts a perspective view of a multi pressure head plug module according to one or more embodiments.

FIG. 3B depicts a cut view of a multi pressure head plug module according to one or more embodiments.

FIG. 3C depicts a diagram of a multi pressure head plug module according to one or more embodiments.

FIG. 4A depicts a cross sectional view of a portion of a multi pressure head plug module in a pigging position according to one or more embodiments.

FIG. 4B depicts a cross sectional view of a portion of a multi pressure head plug module in a deployed position according to one or more embodiments.

FIG. 5D depicts a diagram of a control module data storage according to one or more embodiments.

Figure 1C:
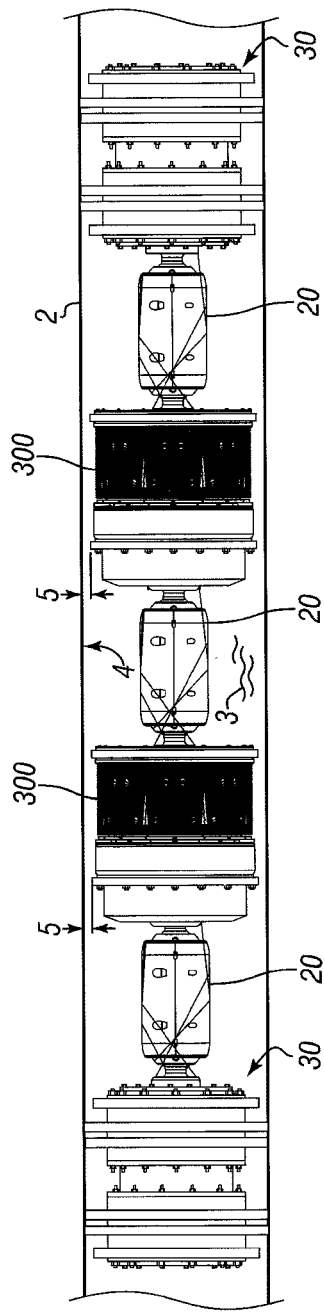
FIG. 1C depicts a pipeline pressure isolation system according to one or more embodiments.

The present embodiments are detailed below with reference to the listed figures.

DETAILED DESCRIPTION OF THE EMBODIMENTS

Before explaining the present apparatus in detail, it is to be understood that the apparatus is not limited to the particular embodiments and that it can be practiced or carried out in various ways.

In some embodiments, the invention can be for a pipeline pressure isolation system used in a pipeline with pipeline fluid.

In some embodiments, the pipeline pressure isolation system can have a multi pressure head plug module disposed in the pipeline.

In some embodiments, the multi pressure head plug module can have a plug body with multiple pressure heads, wherein the pipeline fluid can apply a pipeline fluid differential pressure against the multiple pressure heads.

In some embodiments, the multi pressure head plug module can have a pipeline isolation packer, or seal, secured around a portion of the plug body and a plurality of support disks mounted around a portion of the plug body adjacent the pipeline isolation packer. In some embodiments, the plurality of support discs can be augmented or replaced with another support mechanism or support feature such as rollers, wheels or skates.

In some embodiments, the multi pressure head plug module can have a plurality of sliders mounted around the circumference of the plug body between the grip plates. Said sliders may extend beyond the general profile of the plug body when said plug body is configured to traverse a pipeline and may include wheels.

In some embodiments, the pipeline pressure isolation system can include a ball joint assembly connected to the multi pressure head plug module, and/or control modules, disposed in the pipeline.

In some embodiments, the ball joint assembly can include a ball joint clamshell housing having a chamber, a first pivoting ball joint having a first ball joint interior conduit mounted on one end of the ball joint clamshell housing and a second pivoting ball joint with a second ball joint interior conduit mounted on an opposite end of the ball joint clamshell housing. The first and second ball joint interior conduits fluids in communication via the chamber.

In some embodiments, the pipeline pressure isolation system can include a multi pressure head plug module disposed in a pipeline with pipeline fluid. The multi pressure head plug module can have a plug body having a multi pressure section face, a plurality of support disks mounted around a portion of the plug body, a plurality of grips mounted around a portion of the plug body and a packer or seal secured around a portion of the plug body near the grips.

In some embodiments, an hydrotesting module can be installed in a pipeline with pipeline fluid for testing integrity of a pipeline. The hydrotesting module can have a body with an inflatable bellows connected to the body. The hydrotesting module can have a pressurized gas reservoir fluidly connected to the inflatable bellows and a valve fluidly connected between the pressurized gas reservoir and the inflatable bellows.

In some embodiments, the hydrotesting module has all data gathering, storage and processing devices located outside of the module.

In some embodiments, the hydrotesting module can be configured to perform at least one of: (i) increase pressure in a pipeline at a first segment, (ii) test integrity of the pipeline at a segment, and (iii) decrease pressure in a pipeline in the segment in some embodiments. The present invention relates to an hydrotesting module installed in a pipeline for testing the integrity of the pipeline and connections in the pipeline.

In some embodiments, the hydrotesting module can have a power supply in the body connected to the hydrotesting module processor and a pipeline fluid pressure sensor measuring pipeline fluid pressure and transmitting measured pressure to the hydrotesting module processor for performing calculations to change hydrotesting functions.

In some embodiments, the hydrotesting module processor can connect with a hydrotesting module data storage contained in the body. The hydrotesting module data storage can contain computer instructions to instruct the processor to record detected pipeline fluid pressures from the pipeline fluid pressure sensor and computer instructions to instruct the processor to provide commands to open and close the valve based on a preset pressure stored in the data storage for pipeline fluid.

In some embodiments, the hydrotesting module can be configured to perform at least one of: (i) increase pressure in a pipeline at a first segment, (ii) test integrity of the pipeline at a first segment, (iii) decrease pressure in a pipeline first segment.

In some embodiments, the present invention relates to an hydrotesting module installed in a pipeline for testing the integrity of the pipeline and connections in the pipeline.

In some embodiments, the hydrotesting module can have a power supply in the body connected to a hydrotesting module processor. The hydrotesting module processor can communicate with a hydrotesting module data storage contained in the body.

In some embodiments, the hydrotesting module can have a pipeline fluid pressure sensor for measuring pipeline fluid pressure and transmitting measured pressure to the hydrotesting module processor for performing calculations to change hydrotesting functions.

In some embodiments, the hydrotesting module data storage can contain computer instructions to instruct the hydrotesting module processor to record detected pipeline fluid pressures from the pipeline fluid pressure sensor and computer instructions to instruct the hydrotesting module processor to provide commands to open and close the valve based on a preset pressure stored in the hydrotesting module data storage for pipeline fluid.

In some embodiments, the body of each module can be a metal, a composite, or a plastic, such as PVC. The pressurized gas reservoir in the identified bodies can have a pressure sufficient to expand the bellows enough to increase the pipeline pressure to a target pressure for testing. In embodiments, the pressurized gas reservoir may contain enough compressed gas to expand the bellows.

In some embodiments, the power supply in the identified body can be batteries, such as lithium batteries, or alkaline batteries or a fuel cell. In some embodiments, the power supply can be outside the hydrotest module, with the power supply supplying power to the body or module which requires power. In some embodiments, the pipeline fluid temperature sensor of the hydrotest module body can detect temperatures of pipeline fluid.

In some embodiments, the gas reservoir pressure sensor of the hydrotest module body can measure gas pressure in the pressurized gas reservoir.

In some embodiments, a connection device or a ball joint assembly can connect the hydrotesting module to a linkage connecting to other components in the pipeline.

In some embodiments, the fasteners of the ball joint assembly can be bolts, screws, rivets or weldments.

In some embodiments, the hydrotesting module inflatable bellows can be replaced by either a pneumatic piston connected to the gas reservoir or a variable volume canister. The hydrotesting module inflatable bellows can be made of at least one of: an expandable rubber, a synthetic balloon shaped elastomeric material, expanding packer material, metallic expandable material, or any volumetric changing apparatus.

In some embodiments, the inventive system is used in a multi pressure head pipeline isolation plug. This invention facilitates the creation of a "short" plug by enabling the radial "stacking" of activation interfaces. Stacking of activation interfaces may result in a device with multiple modes of instability. The present inventive system is flexible in that it activates based on encountering the pipe interior wall. In many embodiments of the invention, the system does not have to be specifically tuned for each expected pipe diameter. In some embodiments, the present invention may reduce one or more modes of instability upon activation.

In some embodiments of the present invention a primary wedge is set by a hydraulic cylinder. Due to the wedged faces on its outer surface this linear movement is translated into a radial force which deploys a plurality of secondary wedges outwards towards the pipeline interior diameter; a plurality of grip units are carried outwards with the secondary wedges. The grip units make contact with the pipe interior diameter. Grip units can have teeth, carbide anchors, diamonds, or a high friction coating on their outer surface which grip the pipeline interior diameter. The greater the radial force, the greater the gripping force of the grip units.

In some embodiments, there are multiple movable/sliding interface surfaces involved in achieving the grip function. The interface between the primary wedge and secondary wedge is a first interface. The plurality of interface surfaces between the secondary wedges and the grip units are collectively referred to as the second interface. These interfaces generally are at a parallel angle. In some embodiments, the interface between the primary wedge and the secondary wedge may be a plurality of interface surfaces.

The term "client device" as used herein can refer to a laptop, radio receiver, smart phone, tablet, radiophone, satellite phone, or another computer, such as a wearable computer, which can communicate with a network and process computer instructions.

The term "connections" as used herein can refer to joints, valves, welds, fittings, flanges, hatches, and combinations thereof.

The term "control line" can refer to a communication and/or electricity transmission line and/or hydraulic line and/or pneumatic line that is used between the modules for either unidirectional or bidirectional communication between the modules and between the modules and a network. In some embodiments, the control line can be a coaxial cable, copper core cable, fiber optic cable, or any electrical or communication cable.

The term "control module reservoir" can refer to a reservoir that contains hydraulic fluid or a gas for providing stored energy or medium in which energy can be transferred to hydraulic or pneumatic pistons, other motive devices, and/or radially expanding grips and/or packer seals. The control module reservoir can contain hydraulic fluid, or pneumatic gas. In several embodiments, the control module reservoir can be a gas canister that can be inserted into the control module body.

The term "control module valve" can refer to a needle valve, a ball valve, a check valve, a butterfly valve, a gate valve or a similar type of valve for controlling flow.

The term "cylinder" can refer to a three-dimensional containment shape.

The term "data storage" can refer to any non-evanescent memory area, such as solid state drive, jump drive, hard drive, cloud computing data storage, a plurality of connected data storages for holding computer instructions as well as data from sensors and preset limits for operations of equipment.

The term "fluid" as used herein can refer to a gas, a liquid, a combination of gas and liquid, particulate and gas, particulate and liquid and combinations thereof.

The term "fluid flow line" can refer to a flow line with a hydraulic fluid, such as a hydraulic oil, or a gas, such as nitrogen or air.

The term "gripping engagement" can refer to a holding engagement that stops the multi pressure head module from moving longitudinally in the pipeline.

The term "high pressure packer ring" can refer to a ring in the high-pressure side of the packer when differential pressure is created.

The term "low pressure packer ring" can refer to a ring in the low-pressure side of the packer when differential pressure is created.

The term "isolated" can refer to a section of pipeline that can be pressurized. This can include, but is not limited to, a closed off pressure containing section of pipeline.

The term "hydrotesting" can refer to the act of pressurizing a fluid in a pipeline in order to test the integrity of the pipeline for pressure holding capability.

The term "hydrotesting module" can refer to a module with the ability to increase or decrease pressure in a pipeline by effecting a volumetric change around, or, of said module, or increase or decrease pressure in a pipeline.

The term "message" can refer to an alarm or a text message, a camera image, (video or still) graphic symbol, or other types of notification.

The term "multi pressure head plug module" can refer to a module with a multi pressure section face.

The term "multi pressure section face" can refer to a portion of a multi pressure head plug module that is acted on by pipeline fluid differential pressure. Each section of the multi pressure section face can individually react to the differential pressure and transmit various forces or loads to the multi pressure head plug module.

The term "network" can refer to radio signals transmitted over the air, or a connection to a global communication network, such as the Internet, a satellite network, a cellular network, a local area network, a wide area network or combinations thereof. The network can be hardwired or wireless.

The term "packer" can be a packer as known in the art or a fluid inflatable packer.

The term "packer support ring" can refer to a material that restricts a packer from flowing in an undesired direction.

The term "pipe angled face(s)" can refer to a face of a unit substantially at an angle to the longitudinal axis of a pipe. Specific interaction faces can vary in angle.

The term "pipe parallel face(s)" can refer to a face of a unit substantially parallel to the longitudinal axis of a pipe. Specific interaction faces can vary in angle.

The term "pipe perpendicular face" can refer to an angle substantially perpendicular to a pipe's longitudinal axis.

The term "pipeline pressure isolation system" can refer to a mechanical device that can seal one area of a pipe from another and enable a pressure differential to be created or to exist.

The term "plug body" can refer to an assemblage of components for the multi pressure head plug module which interact in various ways to affect the overall function of said multi pressure head plug module. In one embodiment, the major components of the plug body can include, but are not limited to; high pressure packer ring, low pressure packer ring, packer activation piston, piston rod, primary wedge, grip activation piston, secondary wedge, grip unit, back end unit.

The term "processor" can refer to a computer, a programmable logic circuit, a microcomputer, or similar device capable of executing computer instructions and providing bidirectional communication.

The term "radially expanding grips" refers to elements of the multi pressure head module that can expand into and provide a gripping engagement with the inner surface of the pipeline.

The term "segment" can refer to a portion of a pipeline, such as a one inch segment or a segment that can be several feet in length or several miles in length. Segments can be separated by inches or even miles. In some instances, segments can overlap.

The term "staggered angle tooth configuration" can refer to multiple compound features on the face of an engaging surface.

The term "wedge" as used herein can mean "a substantially inclined three-dimensional device."

In the following description, certain details are set forth such as specific quantities, sizes, etc. so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Turning now to the Figures, FIGS. 1A, 1B, 1C, 1D, and 1E show an exemplar pipeline 2 with pipeline pressure isolation system 8. The pipeline 2 containing pipeline fluid 3.

In some embodiments, the pipeline 2 can have a first multi pressure head plug module 10a disposed in the pipeline and a second multi pressure head plug module 10b disposed in the pipeline.

In some embodiments, a first ball joint assembly 20a can be mechanically connected to the first multi pressure head plug module 10a disposed in the pipeline. The first ball joint assembly 20a can be a two-part construction having a first half and a second half held together with fasteners.

In some embodiments, a second ball joint assembly 20b can be mechanically connected to the second multi pressure head plug module 10b disposed in the pipeline.

In some embodiments, a first control module 30a can be connected to the first multi pressure head plug module 10a through the first ball joint assembly 20a. Also, a second control module 30b can be connected to the second multi pressure head plug module 10b through the second ball joint assembly 20b.

In some embodiments, a control module 30 can be connected to a pipe pig module 300 through the first ball joint assembly 20. In some embodiments, several multi pressure head plug modules 300 can be connected to further control modules, 30, or other multi pressure head plug modules 300 through ball joint assemblies 20 in series or in various permutations, and combinations.

In some embodiments, for a deployed hydrotesting module connected to a pair of multi pressure head plug modules, a first optional linkage 154 can connect a hydrotesting module 40 to the second multi pressure head plug module 10b. Also, a second optional linkage 156 can connect the hydrotesting module 40 to the first multi pressure head plug module 10a.

In some embodiments, for a deployed hydrotesting module connected to a single multi pressure head plug module, a first optional linkage 154 can connect a hydrotesting module 40 to the first multi pressure head plug module 10a through the first control module 30a and ball joint assembly 20a.

In some embodiments, the multi pressure head plug module 10a is shown disposed in the pipeline 2 forming an extrusion gap 5 between the multi pressure head plug module 10a and an inner surface 4 of the pipeline.

In some embodiments, FIG. 1C, the multi pressure head plug module 300 with gripping feature is shown connected with a second multi pressure head plug module 300 through a ball joint assembly 20, the two multi pressure head plug modules 300 with gripping feature connected to control modules 30 through ball joint assemblies 20. Said multi pressure head plug modules 300 with gripping features are shown disposed in a pipeline 2 forming extrusion gaps 5.

Figure 1D:
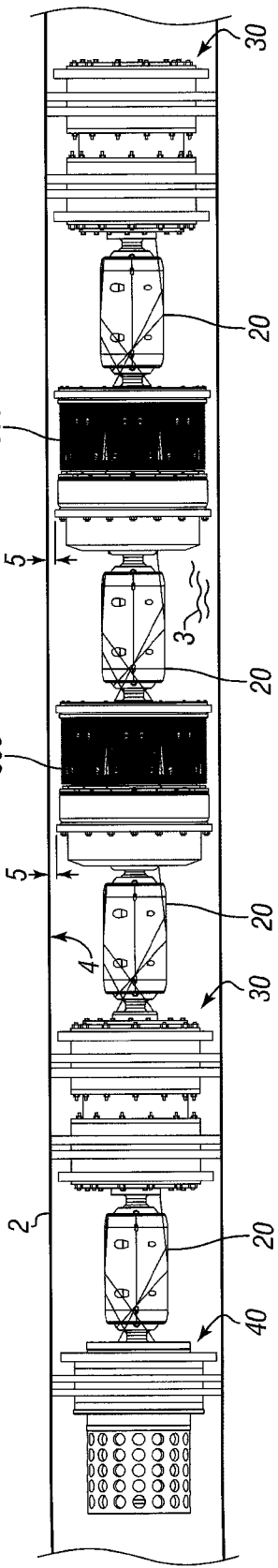
FIG. 1D depicts one embodiment of a deployed hydrotesting module connected to a pipeline pressure isolation system.

FIG. 1D depicts, in some embodiments, a deployed hydrotesting module 40 connected to a pipeline pressure isolation system 8, as shown in FIG. 1C, with a ball joint assembly 20 to affect a hydrotesting system 40 combined with the pipeline pressure isolation system 8.

FIG. 1E depicts, in some embodiments, a deployed hydrotesting module 40 connected to one or more control modules 30 with ball joint assemblies 20, linkage 154, or other linkages known to those skilled in the art, and pigged to a desired location in a coordinated manner with one or more pipeline pressure isolation systems 8 as depicted in 1C to achieve a hydrotest. In some embodiments, a hydrotest module can be deployed independently in a pipeline.

In some embodiments, the hydrotesting module 40, when installed in a pipeline 2 with pipeline fluid 3, is used to test for integrity of the pipeline 2 itself, as well as connections and fittings of the pipeline 2.

FIGS. 2A (perspective view) and 2B (cut view) depict some embodiments, of an hydrotesting module 40.

In some embodiments, the hydrotesting module is shown having a body 41.

In some embodiments, the hydrotesting module 40 is shown having a protective cage 56 mounted to the body 41 with perforations 57 allowing pipeline fluid 3 (FIGS. 1A-1E) to penetrate the protective cage 56.

FIG. 2A depicts a first connection device 150 mounted to the body 41. The first connection 150 device can connect the hydrotesting module 40 to a linkage 154 engaging other components in the pipeline 2. In some embodiments, the body 41 can have inflatable bellows 42 that can connect to and extend from the body 41.

In some embodiments, the hydrotesting module 40 can have a plurality of pigging discs 60a, 60b, and 60c mounted around a portion of the body 41. In some embodiments disk 60a is a guide disk.

In some embodiments, a second connection device 152 can mount to and extend from the protective cage 56. The second connection device 152 can connect the hydrotesting module 40 to a linkage 156 engaging other components in the pipeline 2.

In some embodiments one or both of the connection devices 150, 152 can be replaced with a ball joint assembly 20 such as illustrated in FIG. 1E or any other type of linkage.

In some embodiments, a chamber 160 in the body 41 can contain the instrumentation of the hydrotesting module 40.

In some embodiments, the hydrotesting module inflatable bellows 42 can be replaced by either a pneumatic piston connected to the gas reservoir or a variable volume canister. In some embodiments, the inline hydrotesting module inflatable bellows 42 can be replaced by a hydraulic inflatable bellows, or hydraulic piston.

In some embodiments, the hydrotesting module inflatable bellows 42 can be made from at least one of: an expandable rubber, a synthetic balloon shaped elastomeric material, expanding packer material, a metallic expandable material, or any volumetric expansion device.

Figure 2C:
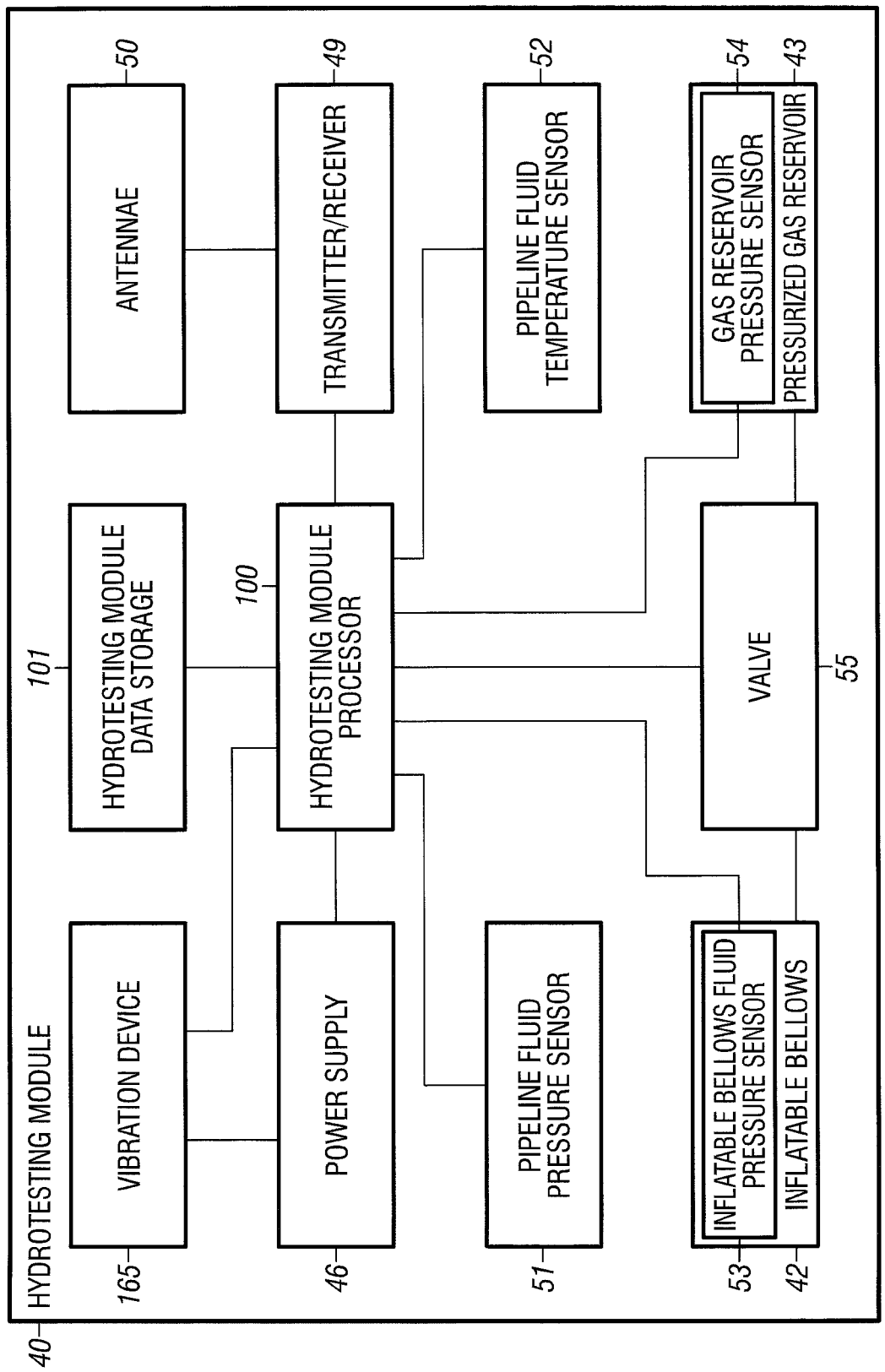
FIG. 2C depicts a diagram of an hydrotesting module according to one or more embodiments.

FIG. 2C illustrates one embodiment of a diagram of the hydrotesting module 40.

In some embodiments, the hydrotesting module 40 can have a pressurized gas reservoir 43 fluidly connected to the inflatable bellows 42 with a valve 55. The valve 55 can engage a hydrotesting module processor 100 with hydrotesting module data storage 101 contained in the body. In embodiments, a power supply 46 in the body can be connected to the hydrotesting module processor 100.

In some embodiments, a pipeline fluid pressure sensor 51 for measuring and transmitting pipeline fluid pressure can be connected to the hydrotesting module processor 100 for performing calculations to change hydrotesting functions.

In some embodiments, a pipeline fluid temperature sensor 52 for measuring and transmitting pipeline fluid temperature can be connected to the hydrotesting module processor 100 for performing calculations to change hydrotesting functions.

In some embodiments, an inflatable bellows fluid pressure sensor 53 can be connected to the hydrotesting module processor 100 for measuring gas pressure in the inflatable bellows 42.

In some embodiments, a gas reservoir pressure sensor 54 for measuring and transmitting gas pressure in the gas reservoir 43 can be connected to the hydrotesting module processor 100, which is connected to the hydrotesting module data storage 101.

Figure 7:
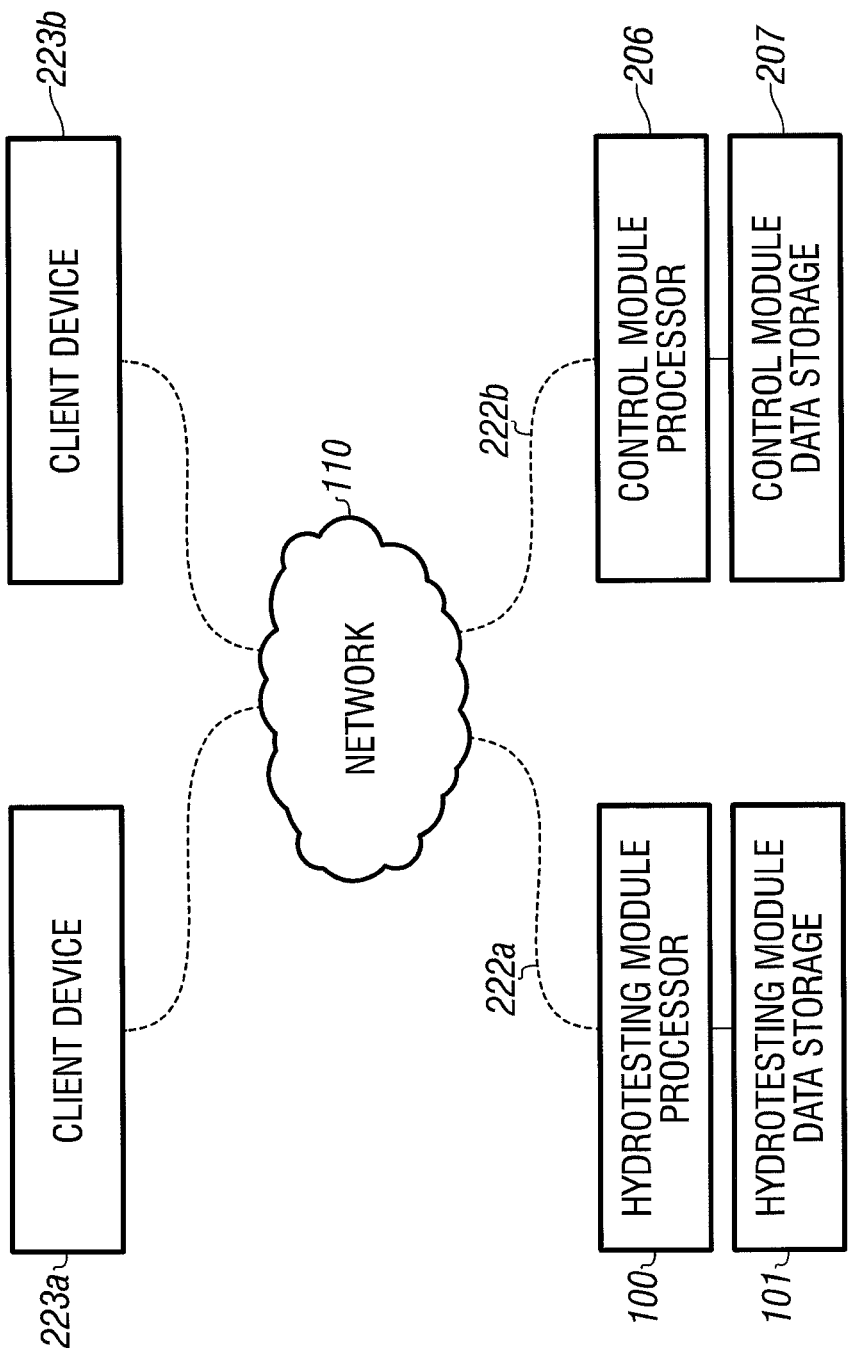
FIG. 7 depicts a diagram of a hydrotesting module processor and a control module processor each connected to a network and client devices according to one or more embodiments.

In some embodiments, a transmitter/receiver 49 can be connected to the hydrotesting module processor 100 for communicating to a network 110 (FIG. 7).

In some embodiments, antennae 50 can be connected to the transmitter/receiver 49.

The antennae can be used for enhancing transmission and receipt of data and commands by the transmitter/receiver 49.

In some embodiments, a vibration device 165 can be connected to the hydrotesting module processor 100 and the power supply 46. The vibration device 165 can operate at a frequency sufficient to agitate or break a biofilm buildup in the pipeline 2 (FIGS. 1A-E).

FIG. 2D depicts one embodiment of a diagram of a hydrotesting module data storage 101.

In some embodiments, the hydrotesting module data storage 101 can have computer instructions 102 to instruct the processor to record and transmit detected pressures from sensors connected to the hydrotesting module processor to a network 110 (FIG. 7).

In some embodiments, the hydrotesting module data storage 101 can have computer instructions 104 to instruct the hydrotesting module processor 100 to provide commands to open and close a valve 55 connected between the pressurized gas reservoir 43 and the inflatable bellows 42 (FIG. 2C) based on a preset pressure stored in the hydrotesting module data storage 101. The preset pressure is used as a comparison to the pressure of the pipeline fluid 3 (FIG. 1A-E).

In some embodiments, the hydrotesting module data storage 101 can contain preset pressures 106 to compare to the pressure of the pipeline fluid 3.

In some embodiments, the hydrotesting module data storage 101 can also contain computer instructions 108 configured to instruct the hydrotesting module processor 100 to automatically do the following sequence (i) increase pressure in a pipeline at a first segment, (ii) test integrity of the pipeline at a first segment; (iii) decrease pressure in a pipeline first segment.

In some embodiments, the hydrotesting module data storage 101 can contain computer instructions 112 to instruct the hydrotesting module processor 100 to record and transmit detected temperatures from sensors connected to the processor connected to a network 110.

Figure 2E:
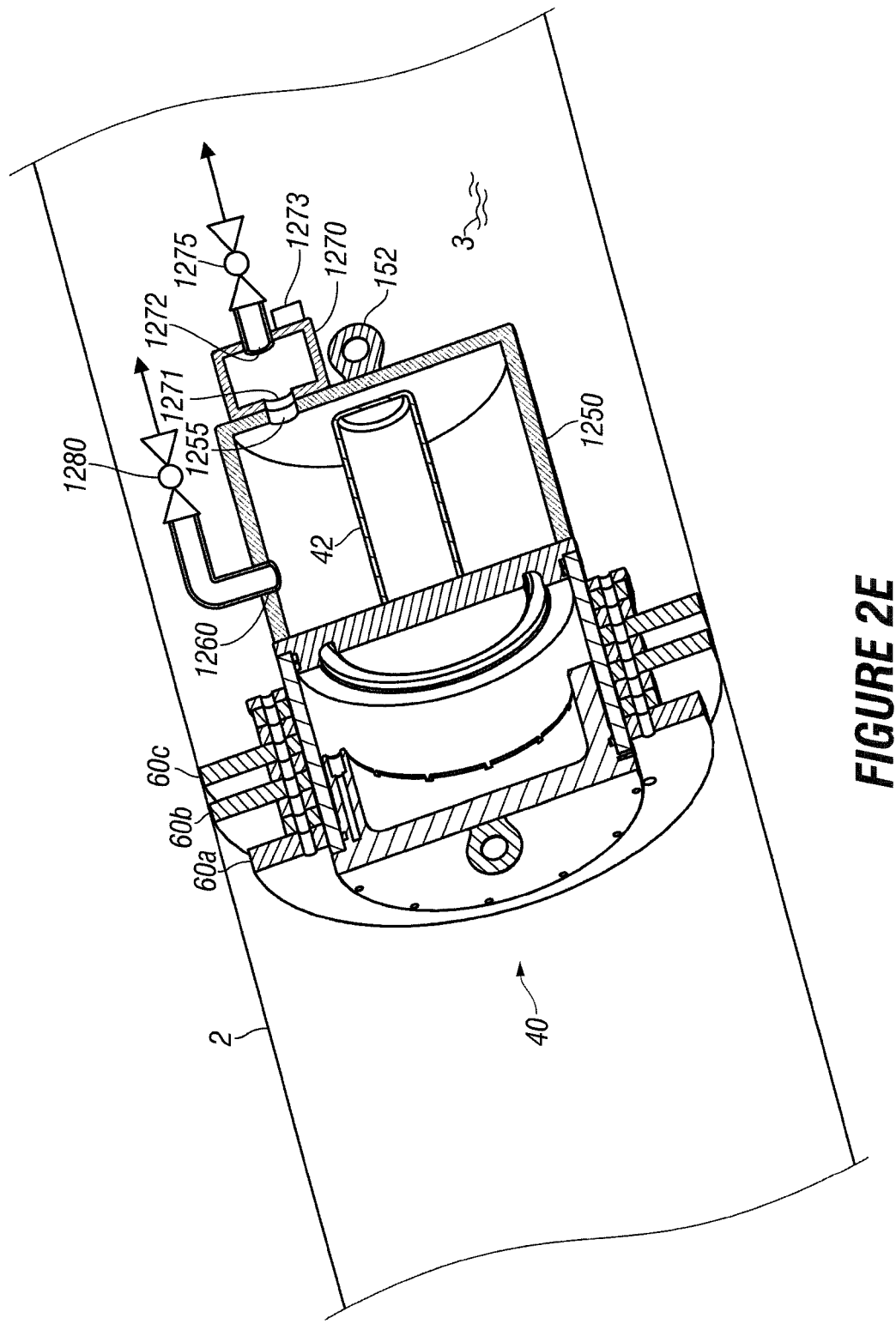
FIG. 2E depicts a diagram of an hydrotesting module according to one or more embodiments.

As shown in FIG. 2E, in some embodiments of the hydrotesting module 40 the cage 56 may be replaced by a chamber 1250 with a limited number of orifices. In some embodiments, this chamber may be fitted with as few as one orifice 1255. In some embodiments, second orifice 1260 is optional. A first orifice 1255 plumbed to a positive displacement pump 1270, or flow meter. Said positive displacement pump 1270 having a first outlet 1271 in communication with the interior of the chamber 1250 and a second outlet 1272 of said positive displacement pump 1270 in communication with the pipeline fluid 3. Said positive displacement pump 1270 able to pump fluid in either direction from the pipeline 2 into the chamber 1250, or from the chamber 1250 into the pipeline 2. Said pump 1270 able to actively pump fluid according to a preset program or external command from a client device 223 over a network 110 (FIG. 7). Said positive displacement pump 1270 having a sensor 1273 to count the number of strokes, rotations or other operable cycles of said positive displacement pump 1270 for the effect of measuring and communicating the volume of fluid displaced through said pump 1270 to a hydrotesting module processor 100 (FIG. 2C), or a client device 223 over a network 110. Said pump alternatively able to respond freely to changes in pressure across the pump and able to measure and communicate fluid passage through said pump if driven by pressure differential between its two outlets 1271, 1272.

In some embodiments, the plumbing for said pump 1270 may also contain a valve 1275 which may be remotely opened and closed to admit fluid to pass into or out of said pump 1270. In some embodiments said chamber 1250 may have a second orifice 1260 plumbed to a valve 1280 which may be remotely opened and closed to admit fluid to pass into or out of the chamber 1250. In some embodiments said chamber 1250 may contain several orifices plumbed to a combination of several valves 1280 and/or several positive displacement pumps and/or flow meters 1270.

In some embodiments, said hydrotesting module 40 with a chamber 1250 may be introduced into the pipeline 2 and transported into position with said valve 1275, or valves 1275, 1280 open or closed. If valves 1275, 1280 are open, the interior of the chamber 1250 will be in communication with the pipeline fluid 3 and said chamber 1250 will be filled with said fluid 3. If valves 1275, 1280 are closed, module may be introduced into the pipeline with some other fluid contained inside the chamber 1250 such as water, corrosion inhibitor, a dye or other indicating fluid, or a gas.

In some embodiments, after the pipeline hydrotest segment is isolated the valves 1275, 1280 attached to the chamber 1250 may be opened to allow fluid communication between the inside of the chamber 1250 and the pipeline 2. If a fluid was deliberately carried to the hydrotest segment, it will be released and the surrounding pipeline fluid 3 will flood the chamber 1250, Fluid exchange may be driven between the pipeline fluid 3 and interior of the chamber 1250 by pressure differential, diffusion, or the positive displacement pump 1270. After the chamber 1250 is flooded with pipeline fluid 3, the valve 1280 may be closed. The inflatable bellows 42 may then be inflated. This will displace hydrotest fluid out of the chamber 1250 through the positive displacement pump 1270. The positive displacement pump 1270 combined with the sensor 1273 may be used as a gauge to measure how much fluid was displaced to create the desired hydrotest pressure in the pipeline 2. When the hydrotest is complete, the positive displacement pump 1270 can be used to pump hydrotest fluid back into the canister 1250, collapsing the inflatable bellows 42 and returning pipeline pressure to the level it was before the hydrotest.

In some embodiments, the hydrotest module 40 may be introduced into the pipeline while the inflatable bellows 42 is already inflated and valves 1275, 1280 on the chamber 1250 outlets 1255, 1260 are closed. Said valve 1275, attached to the chamber 1250 through the positive displacement pump 1270 may be opened to allow communication between the inside of the chamber 1250 and the pipeline 2. The positive displacement pump 1270 can be used to pump pipeline fluid 3 into the chamber, 1250 collapsing the inflatable bellows 42 and reducing pipeline pressure.

In some embodiments, the present invention can increase or decrease the pressure in a section of a pipe.

Figure 17:
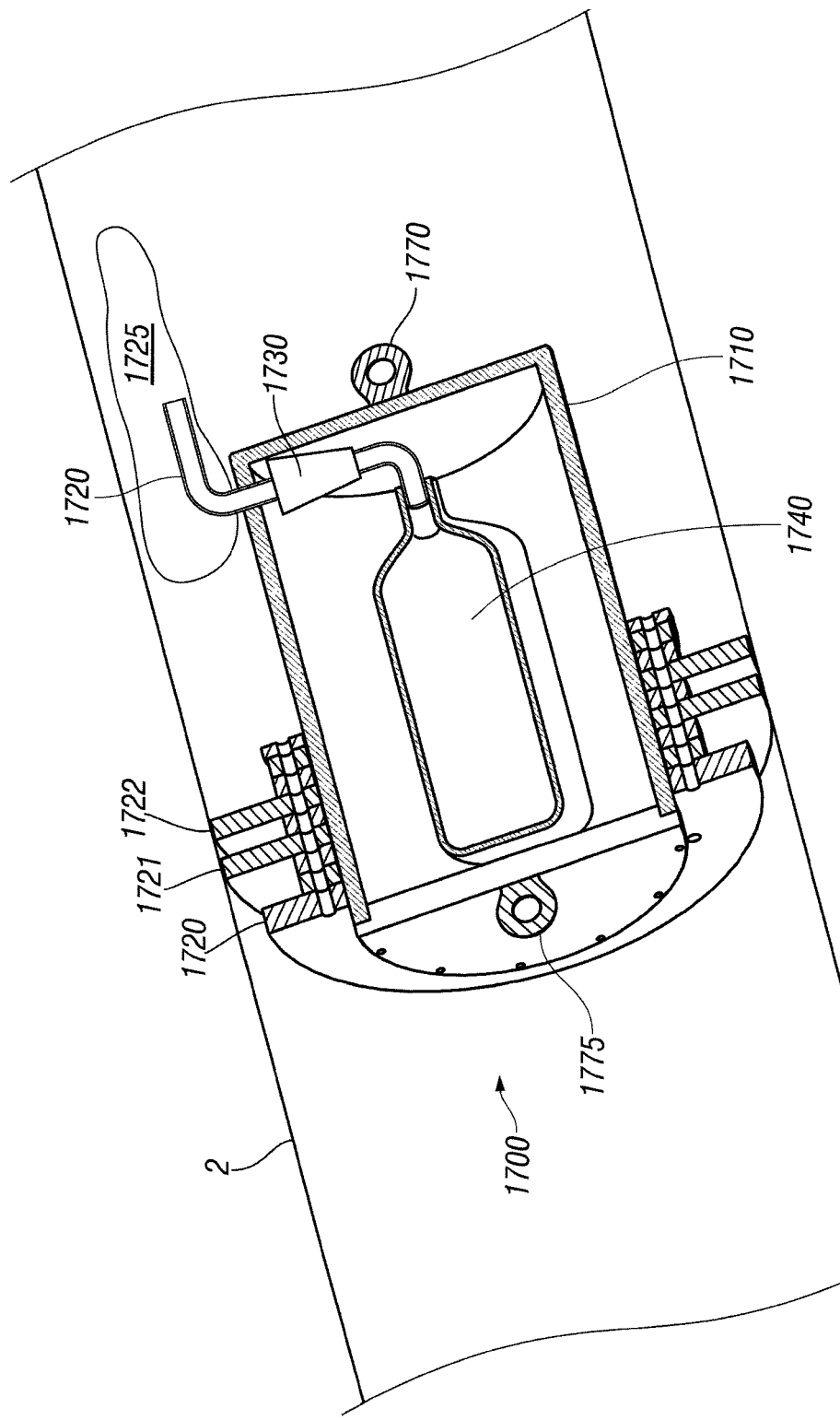
FIG. 17 depicts a diagram of an hydrotesting module according to one or more embodiments.

In some embodiments, (as shown in FIG. 17) in preparation for hydrotesting, a segment of pipeline 2 will be isolated whether by valves, pipeline isolation tools or multipressure module 10, 300, or other strategies. This segment will then generally have its normally carried product removed and replaced by water or another fluid. Due to various factors, some gas phase fluid, whether natural gas, nitrogen, other gases, or air, may remain in the isolated hydrotest segment. As a gas phase fluid will tend to be lighter than water or another liquid phase fluid, this gas 1725 will collect at the high point of the isolated pipeline segment. This may be at one end of the segment or at some localized point or along the top dead center of a level section of pipeline. A need exists for removal of this gas phase bubble to facilitate a hydrotest. The present invention fills this need.

In some embodiments, the present invention can be for an hydrotesting module 40. In some embodiments, this invention can be incorporated into a pipeline pressure isolation plug 10, 300 or control module 30. In some embodiments, this invention can be a stand-alone module 40 used as part of an overall pipeline pressure altering plan. This invention incorporates a body 1710, gas fluid intake 1720, compressor 1730 and storage cylinder 1740. The compressor 1730 can be used to draw gas phase fluid 1725 from the pipeline and compress it into the storage cylinder 1740, reducing or eliminating the amount of free gas in the pipeline. Said compressor 1730 is able to compress gas phase fluid according to a preset program or external command from a client device 223 over a network 110 (FIG. 7). Said module 40 may further comprise guide discs 1720 and pigging discs 1721 to facilitate pigging in a pipeline. Said module 40 may further comprise connection devices 1770, 1775 which may be used with linkages engaging other components in the pipeline 2.

FIGS. 3A and 3B depict the multi pressure head plug module 10.

In some embodiments, the multi pressure head plug module 10 can have a multi pressure section face 71. Pipeline fluid can apply a pipeline fluid pressure differential against the multi pressure section face 71. The multi pressure section face 71 can have a plurality of pressure heads 12a, 12b, 12c. In some embodiments, support disks 74a and 74b are also depicted surrounding a plug body 70. In some embodiments, the support discs 74a and 74b may be augmented or replaced with another support mechanism such as rollers, wheels or skates.

In some embodiments, the packer support ring 11 can expand radially when the grips 73a-d move or the control module provides a signal to the control module valve to pressurize a pressure chamber 69 in the multi pressure head plug module 10 or 300 to expand the packer support ring 11.

In some embodiments, the packer support ring 11 can be configured to expand radially and partially or completely bridge both the plurality of extrusion gaps and a plurality of unsupported gaps 75a, 75b, and 75c between the plurality of radially expanding grips 73a, 73b, 73c, 73d and when the radially expanding grips are in the deployed or activated position.

In some embodiments, a pipeline isolation seal, (alternatively referred to as a "packer" or "packer seal") 76 is located near expanding grips 73a, 73b, 73c, 73d.

In some embodiments, a plurality of sliders 375 can be located between the plurality of radially expanding grips 73a, 73b, 73c, 73d. Said sliders can extend beyond the outer diameter formed by said grips when the grips are arranged in a pigging position, also referred to as a nonactivated position. The outward ends of the sliders may terminate in wheels.

FIG. 3C depicts a diagram of a multi pressure head plug module 10 with a multi pressure head plug internal packer cylinder set pressure sensor 77. The multi pressure head plug internal packer cylinder set pressure sensor 77 can be in communication with the control module processor 206 (FIG. 5C) through a control line 31.

In some embodiments, a multi pressure head plug internal hydraulic cylinders set pressure sensor 78 can be in communication with the control module processor 206 through the control line 31. The control line 31 can connect the control module to the multi pressure head plug module 10.

In some embodiments, a multi pressure head plug internal hydraulic cylinders unset pressure sensor 79 can be in communication with the control module processor 206 through the control line 31. The control line 31 can connect the control module to the multi pressure head plug module 10.

In some embodiments, a multi pressure head plug pipeline fluid pressure sensor, low pressure side 80 can be in communication with the control module processor 206 through the control line 31. The control line 31 can connect the control module to the multi pressure head plug module 10.

In some embodiments, a multi pressure head plug pipeline fluid pressure sensor, high pressure side 81 can be in communication with the control module processor 206 through the control line 31. The control line 31 can connect the control module to the multi pressure head plug module 10.

In some embodiments, the control line 31 can be configured to pass from a control module 30 to the multi pressure head plug module 10 (or 300) through a ball joint assembly 20 having a first ball interior conduit 28a (FIG. 6), and a chamber 23 to a second ball interior conduit 28b.

In some embodiments, a fluid flow line 35 can have a pressurized fluid. The fluid flow line 35 can connect a control module 30 to the multi pressure head plug module 10 (or 300).

Figure 6:
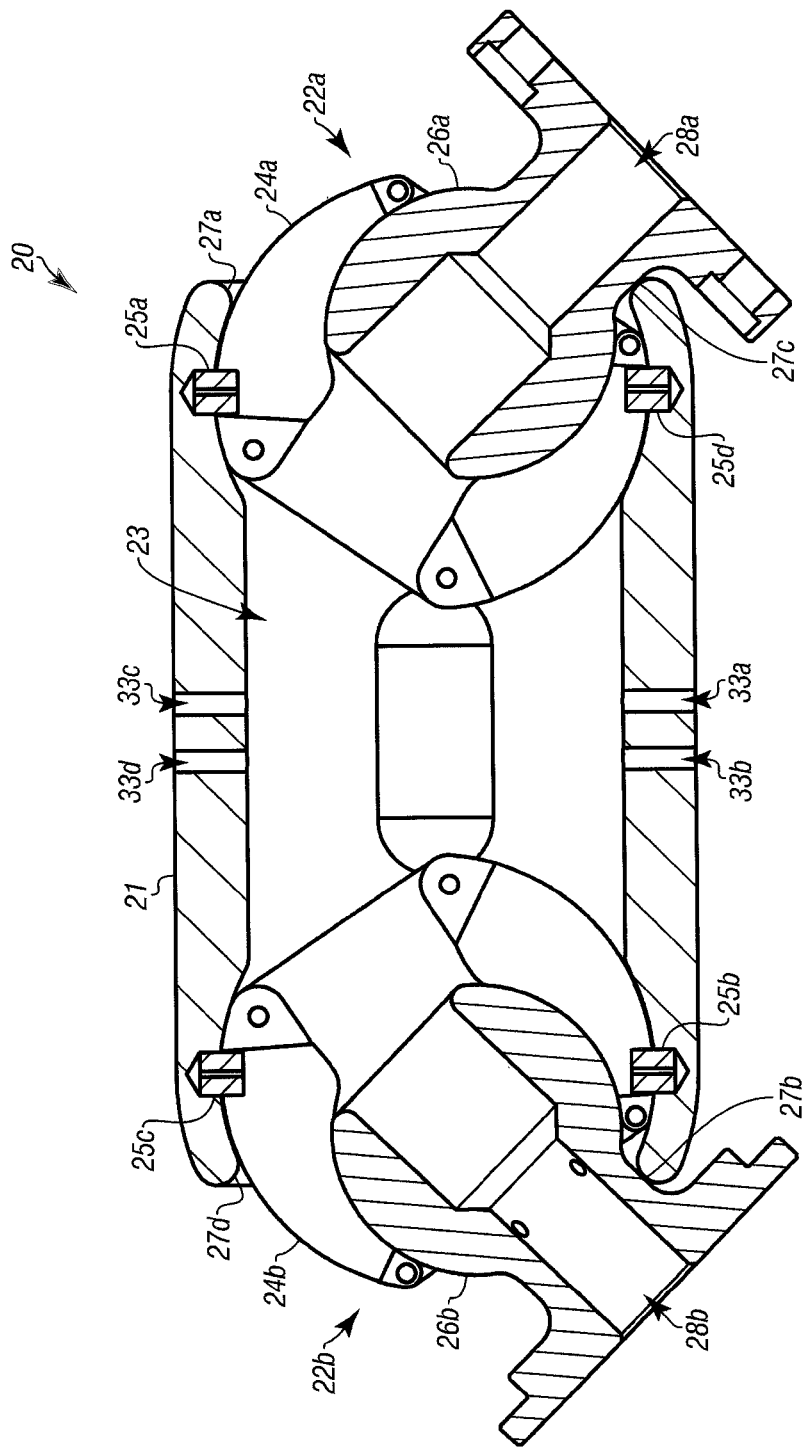
FIG. 6 depicts a cut view of a ball joint assembly according to one or more embodiments.

In some embodiments, the fluid flow line 35 can be configured to pass from the control module 30 to the multi pressure head plug module 10 or 300 through a ball joint assembly 20 having a first ball interior conduit 28a, and a chamber 23 to a second ball interior conduit 28b (FIG. 6).

FIGS. 4A and 4B show some embodiments of part of the multi pressure head plug module 300 with a primary wedge 70 in a pigging position, also referred to as an unactivated phase (FIG. 4A) and a deployed position in FIG. 4B, also referred to as an activated phase.

Figure 5B:
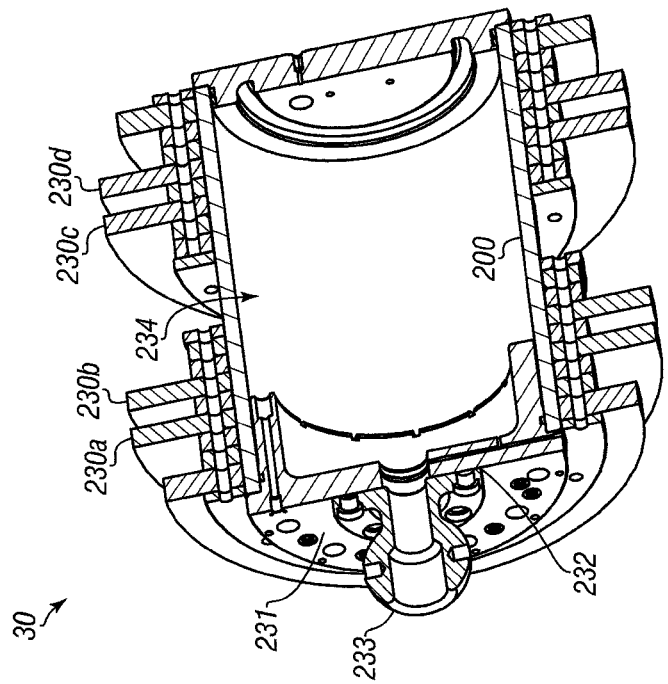
FIG. 5B depicts a cut view of a control module according to one or more embodiments.
Figure 5A:
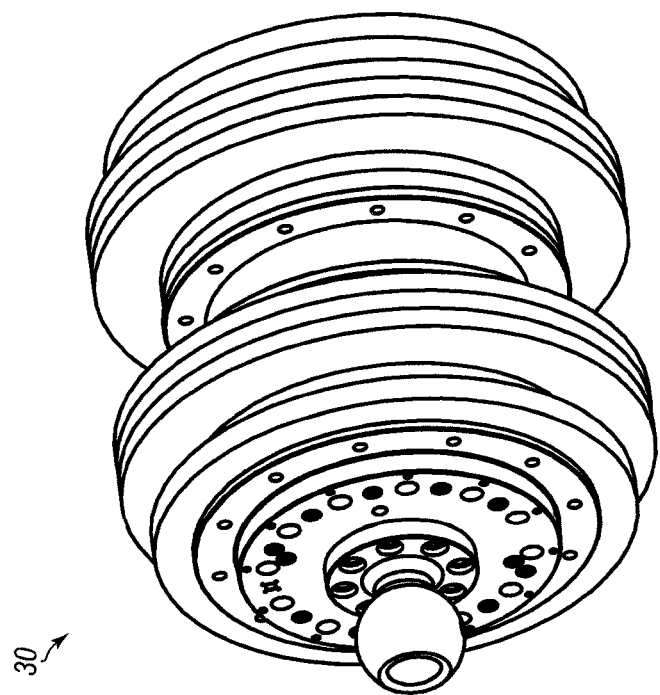
FIG. 5A depicts a perspective view of a control module according to one or more embodiments.

FIGS. 5A and 5B show one embodiment of a control module 30 having a body 200.

In some embodiments, a plurality of pigging disks 230a, 230b, 230c, and 230d can be mounted around a portion of the body 200. The pigging discs 230a, 230b, 230c, and 230d can provide a sealing surface that enables the control module 30 to move down the pipeline 2 using the pressure and flow of the pipeline fluid 3 (FIG. 1A-E).

In some embodiments, the control module 30 can have a face 231 with a ball seat 232 that receives a ball 233 (or 26a or 26b as in FIG. 6) from a ball joint assembly 20.

In some embodiments, the control module 30 can have an inner cavity 234, which does not receive pipeline fluid and contains the processor and data storage, power supply and sensors of the control module 30 as known in the art.

Figure 5C:
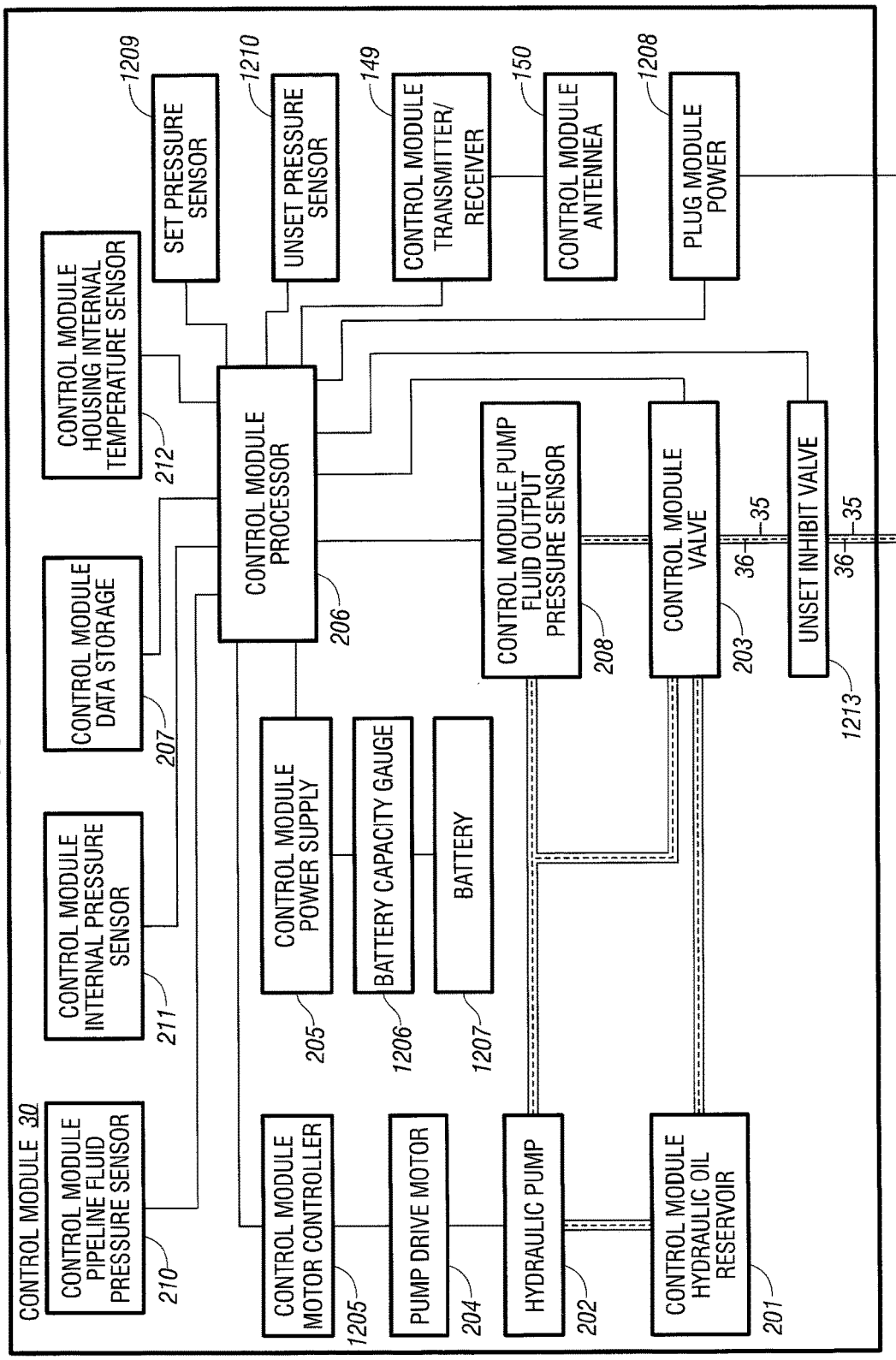
FIG. 5C depicts a diagram of a control module according to one or more embodiments.

FIG. 5C is a diagram of some embodiments of a control module 30 having a control line 31 (FIG. 3C) connecting the control module 30 to a multi pressure head plug module 10 or 300. The control module 30 can have a control module reservoir 201 in the control module body 200 (FIG. 5B). In some embodiments, control module reservoir comprises a control module hydraulic oil reservoir 201.

In some embodiments, a pump 202 can be connected to the control module reservoir 201 in the control module body. A motor 204 can be connected to the pump in the control module body 200 and to a control module motor controller 1205 and then to a control module processor 206 in the control module body 200.

In some embodiments, the control module power supply 205 can also provide power to a control module processor 206. The control module processor 206 can communicate with a control module data storage 207.

In some embodiments, the control module power supply 205 is connected to a battery capacity gauge 1206 which is connected to a battery 1207. In some embodiments, the battery 1207 may be lithium batteries, alkaline batteries or another source of electrical energy such as a fuel cell.

In some embodiments, the control module processor 206 can communicate with the control module motor controller 1205.

In some embodiments, the control module 30 can have a control module pump fluid output pressure sensor 208 connected to the control module processor 206 for comparing detected pump fluid output pressures to preset pump pressures in the control module data storage 207.

In some embodiments, the control module processor 206 can provide a message to a client device 223a or 223b (FIG. 7) through transmitter/receiver 149 connected to control module antenna 150.

In some embodiments, (FIG. 5C), a control module valve 203, connected to the pump 202, can be positioned between the pump 202 and a pressurized fluid outlet 1229. The control module pump fluid output pressure sensor 208 can monitor pressure passing through the control module valve 203 or can be in a fluid flow line 35 or in the control module valve 203.

In some embodiments, the control module valve 203 can enable pressurized fluid in fluid flow line 35 to exit the control module 30 through the pressurized fluid outlet 1229. The control module valve 203 can be operated by the control module processor 206 for controlling fluid flow to the multi pressure head plug module 10 or 300.

In some embodiments, a control module pipeline fluid pressure sensor 210 can be mounted in, or on, the control module 30 for measuring and transmitting pipeline fluid pressure to the control module processor 206. The control module processor 206 can compare detected pipeline fluid pressures to preset pipeline fluid pressures in the control module data storage 207 and provide a message to a client device 223a or 223b enabling modification of pumping when the detected pipeline fluid pressures fall below or exceed the preset pipeline fluid pressures.

In some embodiments, a control module transmitter/receiver 149 can be connected to the control module processor 206 for communicating measured pressures and temperatures to a network. A control module antenna 150 can be connected to the control module transmitter/receiver 149.

In some embodiments, control module antennae 150 can be connected to the control module transmitter/receiver 149. The control module antennae 150 can be for enhancing transmission and receipt of data and commands by the transmitter/receiver 149.

In some embodiments, plug module power 1208 delivers power from the control module 30 to multi pressure head plug module 10 or 300. In some embodiments, set pressure sensor 1209 monitors the pressure in the control fluid set circuit. In some embodiments, unset pressure sensor 1210 monitors the pressure in the control fluid unset circuit.

In some embodiments, control module internal pressure sensor 211 is connected to control module processor 206. Control module internal pressure sensor 211 monitors pressure inside control module body 200 and reports data to control module processor 206.

In some embodiments, control module housing internal temperature sensor 212 is connected to control module processor 206. Control module housing internal temperature sensor 212 monitors temperature inside control module body 200 and reports data to control module processor 206.

FIG. 5D depicts one embodiment of the control module data storage 207.

In some embodiments, the control module data storage 207 can have, computer instructions 302 in the data storage 207 configured to instruct the control module processor 206 to provide controlled pressure to activate the packer seal 76 of the multi pressure head plug module 10 or 300.

In some embodiments, the control module data storage 207 can have preset pump pressures 303.

In some embodiments, the control module data storage 207 can have computer instructions 304 for instructing the control module processor 206 to provide controlled pressure to activate the radially expanding grips 73a-b of the multi pressure head plug module 10 or 300.

In some embodiments control module data storage 207 can have computer instructions 312 to instruct the control module processor 206 to compare detected pump fluid output pressures to preset pump pressures and provide a message to a client device 223a or 223b and enabling modification of pumping when the detected pump fluid output pressure falls below or exceeds the preset pump pressures.

In some embodiments, control module data storage 207 can have computer instructions 310 to instruct the control module processor 206 to a signal to the control module valve 203 to pressurize a pressure chamber in the multi pressure head plug module 10 or 300 to expand the packer support ring 11.

FIG. 6 is a cut view of a ball joint assembly 20.

In some embodiments, the ball joint assembly 20 can be connected to the multi pressure head plug module 10 or 300 disposed in the pipeline.

In some embodiments, the ball joint assembly 20 can have a ball joint clamshell housing 21. The ball joint clamshell housing can have a chamber 23.

In some embodiments, a first pivoting ball joint 22a can be mounted in the ball joint clamshell housing 21 having a first ball joint interior conduit 28a mounted on one end of the ball joint clamshell housing 21. Also, a second pivoting ball joint 22b with a second ball joint interior conduit 28b can be mounted on an opposite end of the ball joint housing 21. The first and second ball joint annuli can be fluidly connected via the chamber 23.

In some embodiments, each pivoting ball joint 22 can have outer pivoting ball hemisphere 24a and 24b slidingly engaging an inner pivoting ball joint adapter 26a and 26b respectively and slidably engaging the ball joint clamshell housing 21.

In some embodiments, the ball joint assembly 20 can have a plurality of fluid communication ports 33a, 33b, 33c, and 33d.

In some embodiments, the ball joint assembly 20 can have a plurality of outer articulation stops 25a, 25b, 25c, and 25d formed on an inner surface of the ball joint clamshell housing 21. The ball joint assembly 20 can have a plurality of end articulation stops 27a, 27b, 27c, and 27d formed on an outer surface of the ball joint housing 21.

Figure 14:
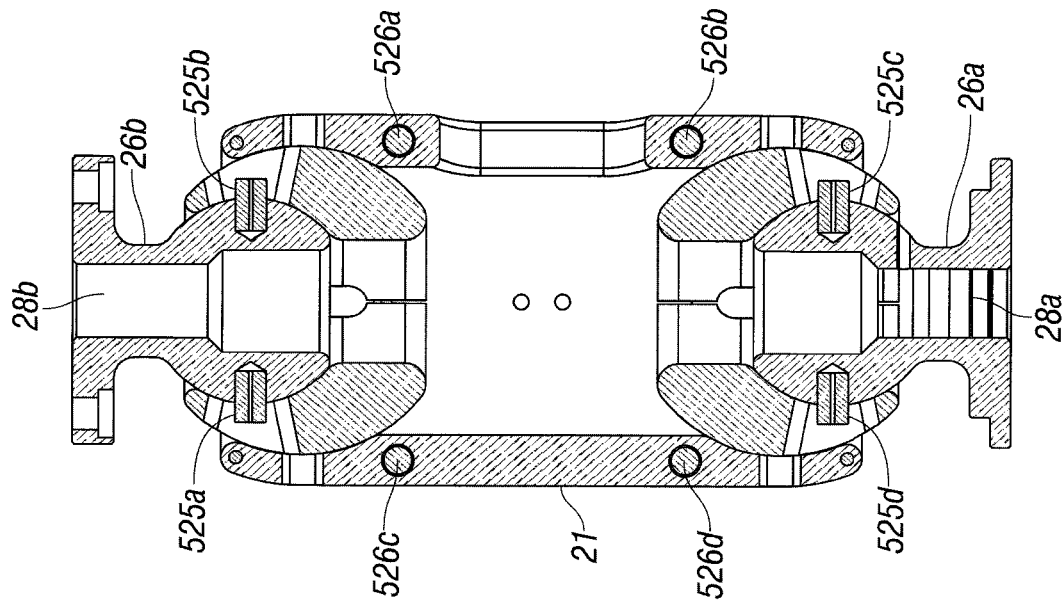
FIG. 14 depicts another embodiment, of a cut view of a ball joint assembly.

The ball joint assembly 20 can have a plurality of inner articulation stops 525a, 525b, 525c, 525d formed on the outer surface of the ball joint adapter 26a and 26b (FIG. 14). Each articulation stop limits pivoting of a pivoting ball joint 22a and 22b and limits differential rotation of the ball joint clamshell housing 21 and outer pivoting ball hemisphere 24a and 24b and inner pivoting ball joint adapter 26a and 26b.

FIG. 7 shows one embodiment of a diagram of a hydrotesting module processor 100 connected to a hydrotesting module data storage 101. The hydrotesting module processor 100 can be connected to a network 110 substantially simultaneously via a transmitter/receiver either on board the hydrotest module or the control module that further communicates with a plurality of client devices simultaneously 223a and 223b using at least one message 222a (FIG. 2C).

In some embodiments, a control module processor 206 can communicate with a control module data storage 207. The control module processor 206 can connect to the network 110 and further communicate substantially simultaneously via a transmitter/receiver either on board the hydrotest module or the control module then with a plurality of client devices 223a and 223b using at least one message 222b. Said network 110 can be formed using one or more wireless communication technologies or formed using wired communication technologies, or some combination thereof (FIG. 5C).

Figure 8:
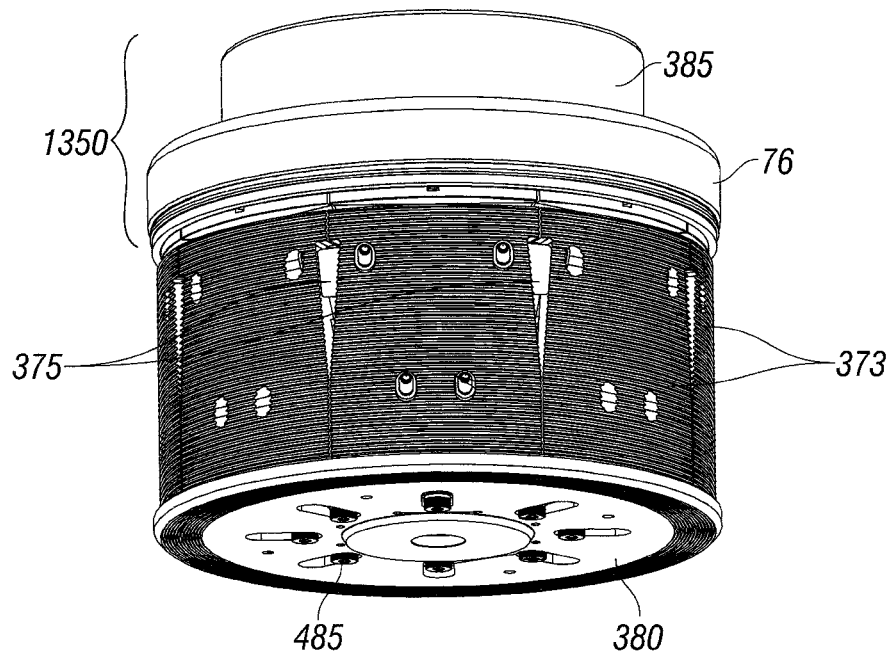
FIG. 8 depicts one embodiment of a side view of a portion of a staggered gripping wedge mechanism subassembly.

FIG. 8 illustrates one embodiment of a subassembly of the present invention. As illustrated is one exterior aspect of a pipe gripping mechanism subassembly 1350. As illustrated is exterior grip or gripping units 373. Exterior grip unit 373 is preferably constructed of a material capable of use in interior pipe gripping. Also shown is back end unit 380. Back end unit 380 is preferably constructed to restrict adjacent components from relative movement parallel to the pipeline longitudinal axis and guide the secondary wedges 370 (FIG. 9) and grip units 373 in radial movement. Further illustrated is the low-pressure packer ring 385 and pipeline isolation seal 76.

Figure 9:
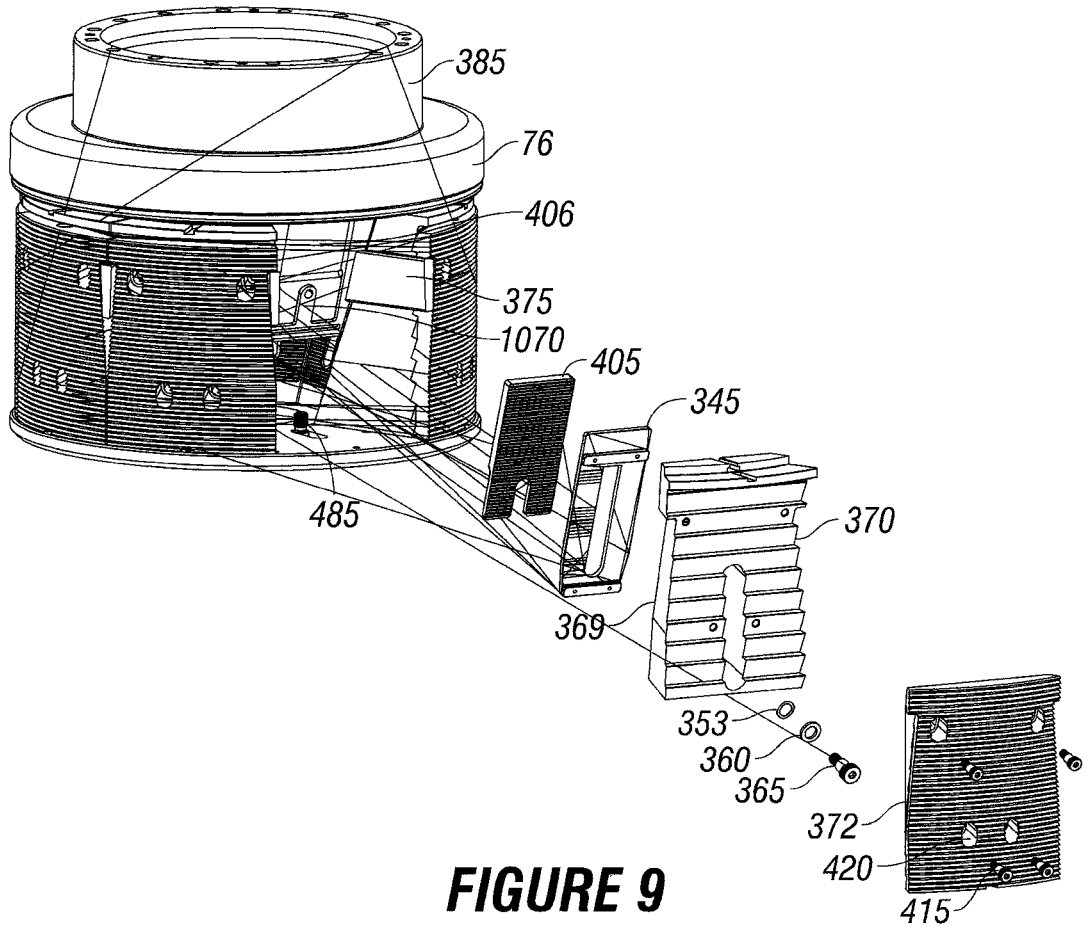
FIG. 9 depicts one embodiment of a side view and partial exploded view of a staggered gripping wedge mechanism subassembly.

FIGS. 8 and 9 show one assembled embodiment of the interior of a staggered gripping wedge mechanism subassembly 1350. Staggered gripping wedge mechanism subassembly 1350 is preferably constructed of durable materials, as is known in the industry such as steel, corrosion resistant steel alloy, aluminum, titanium or polymer-fiber composites for internal use in pipe pigging and gripping operations. As shown, a plurality of grip or gripping units 373 substantially encircle lower portion of subassembly 1350. The gripping units 373 are preferably constructed of materials utilized for gripping the interior of a pipe when in use. As shown, gripping units 373 are constructed with an outer face for gripping capacity. The outer face may be coated or treated to increase its hardness such as by carburizing, induction hardening, hard facing or other processes known to those skilled in the art. Alternatively the outer face of gripping units 373 could be fitted with hardened steel or hard carbide or ceramic inserts to improve gripping capacity. Alternatively, the outer face of gripping units 373 could be coated with a high friction coating such as braised or embedded carbide grit, diamond coated, thermal spray high friction coating or high friction elastomer coating.

Figure 10:
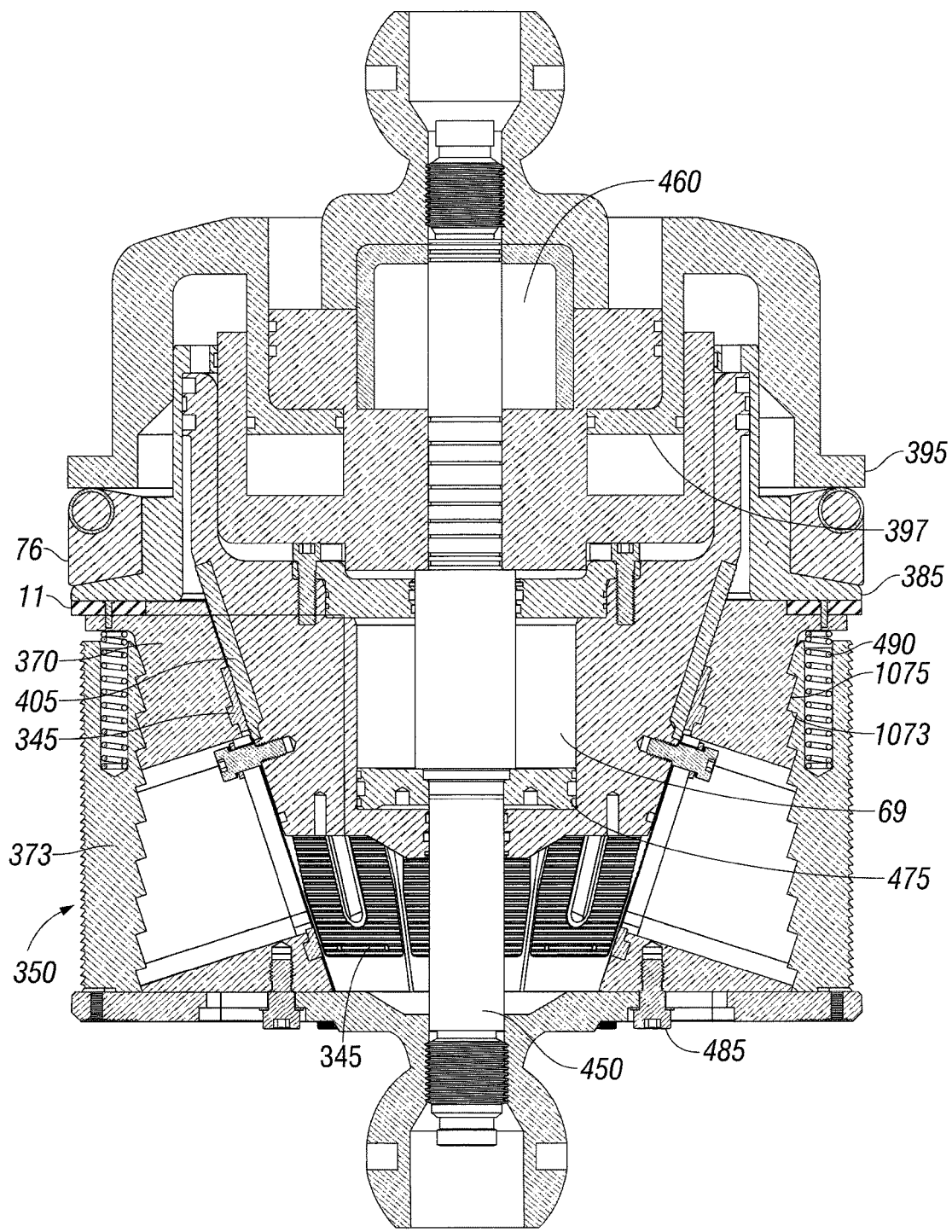
FIG. 10 depicts one embodiment of a side cut view of a staggered gripping wedge and sealing mechanism subassembly in nonactivated phase.

FIG. 9 illustrates one embodiment of the present invention which is the staggered gripping wedge mechanism subassembly 1350 in partially exploded view. The exploded view shows one set of components used in the gripping system, which are representative of a plurality of such components which are repeated in a pattern around the plugs central axis. As shown, grip unit 373 may be constructed with grip unit shoulder bolt slots 420 and grip unit shoulder bolts 415. Slots 420 and bolts 415 are preferably designed to engage grip units 373 to secondary wedges 370, while allowing some sliding movement between the grip units 373 and the secondary wedges 370 along the plurality of activation planes 1075 (FIG. 10).

As shown, grip unit 373 back interface 372 is preferably constructed in a staggered ridge capacity in a manner so as to be able to mechanically engage with secondary wedge 370. Secondary wedge 370 is preferably comprised of a material designed to be utilized in a pipe pigging application as known in the industry such as a steel, corrosion resistant steel alloy, aluminum, titanium or polymer fiber composite.

Secondary wedge 370 is preferably constructed with front face with staggered wedges formed by repeating features 1073 and 1075 (FIG. 10) designed to interface with grip unit back interface 372. Also illustrated, located in proximity to secondary wedge 370, are shoulder bolts 365 as well as springs 360 and washers 353 designed to interface with secondary wedge 370 and primary wedge 1070. Secondary wedge insert 345 is preferably designed to interface with a recess in the back of secondary wedge 369. Secondary wedge insert 345 may be retained on the interior face of the secondary wedge 370 by any combination of bolts, screws, clips, an adhesive, a close tolerance or press fit, a loose mechanical fit retained by the close proximity of related components.

Primary wedge insert 405 is preferably designed to interface with a recess 406 in an outer face of primary wedge 1070. Primary wedge insert 405 may be retained on the face of the primary wedge 1070 by any combination of bolts, screws, clips, an adhesive, a close tolerance or press fit, a loose mechanical fit retained by the close proximity of related components. The bolt 365, washer 353 and spring 360 engage the interface slot in the secondary wedge 370 such that the assembly forms a track which allows relative movement between the primary wedge 1070 and secondary wedge 370 in a generally linear fashion substantially parallel to the major pipe planar faces of the primary wedge 1070. The spring 360 allows some relative movement of the primary and secondary wedges 1070 and 370 toward and away from each other such that the two insert units 345 and 405 may move over each other, while allowing for localized changed in the direction of movement to accommodate the compound geometry on the interfacing surfaces of the inserts 345, 405. This is illustrated further in FIGS. 12A, 12B, and 15. Bolts 365, 415, and 485 can be any moving slot retention devices as are known in the art.

Secondary wedge insert 345 and primary wedge insert 405 are preferably constructed with s faces with staggered ridged formations designed to increase grip and utility of the entire assembly when the wedges 370 and 1070 (FIG. 10) are actuated.

Alternatively, the inserts may be constructed with faces with a mating wave pattern or other features which will induce instability. It should be apparent to those skilled in the art that rather than use inserts 345 and 405 these features may be constructed directly on the mating faces of primary wedge 1070 and secondary wedge 370. The compound geometry on the interface surfaces between 345 and 405 may be such that the average surface, or linear least squares best fit approximation of the surface is arranged to be substantially parallel to the face of the part they fit into (1070, 345), and to each other.

FIG. 10 illustrates one embodiment of the present invention and partial cross-section during a nonactivated phase. As illustrated piston rod 450 substantially traverses the entirety of the staggered gripping wedge and seal subassembly 1350. Piston rod 450 and grip activation piston 475 interacts with grip activation hydraulic cylinder chamber 69 interior to the primary wedge 1070 (FIG. 9) during operation such that the primary wedge 1070 can move traverse relative to the piston rod 450 and piston 475 during operation in a manner known in the art.

Also, illustrated adjacent to piston rod 450 is chamber 460 which, during implementation, is designed to contain various electronic and hydraulic control and instrumentation systems, hydraulic passageways and other parts utilized in standard pipe pigging operations.

Further illustrated in FIG. 10 are the low-pressure packer ring 385 as well as the back-unit shoulder bolt 485. The low-pressure packer ring 385 and the high-pressure packer ring 395 are adjacent to and restrain the pipeline isolation seal 76. Also shown is the packer activation hydraulic piston 397.

Further illustrated are the grip unit springs 490 which interact directly with grip units 373 and the secondary wedges 370.

As illustrated, in further detail are secondary wedge stop surface 1073 as well as secondary wedge activation surfaces 1075. Surfaces 1073 and 1075 substantially act as the staggered interaction faces. As shown, secondary wedges 370 are in direct interaction with the secondary wedge stop surfaces 1073 and secondary wedge activation surfaces 1075.

Further shown in FIG. 10 is the primary wedge insert 405 and secondary wedge insert 345 as illustrated with staggered ridge is preferably designed to increase grip under certain boundary conditions when interacting with primary and secondary wedges 1070 and 370 respectively.

Figure 11:
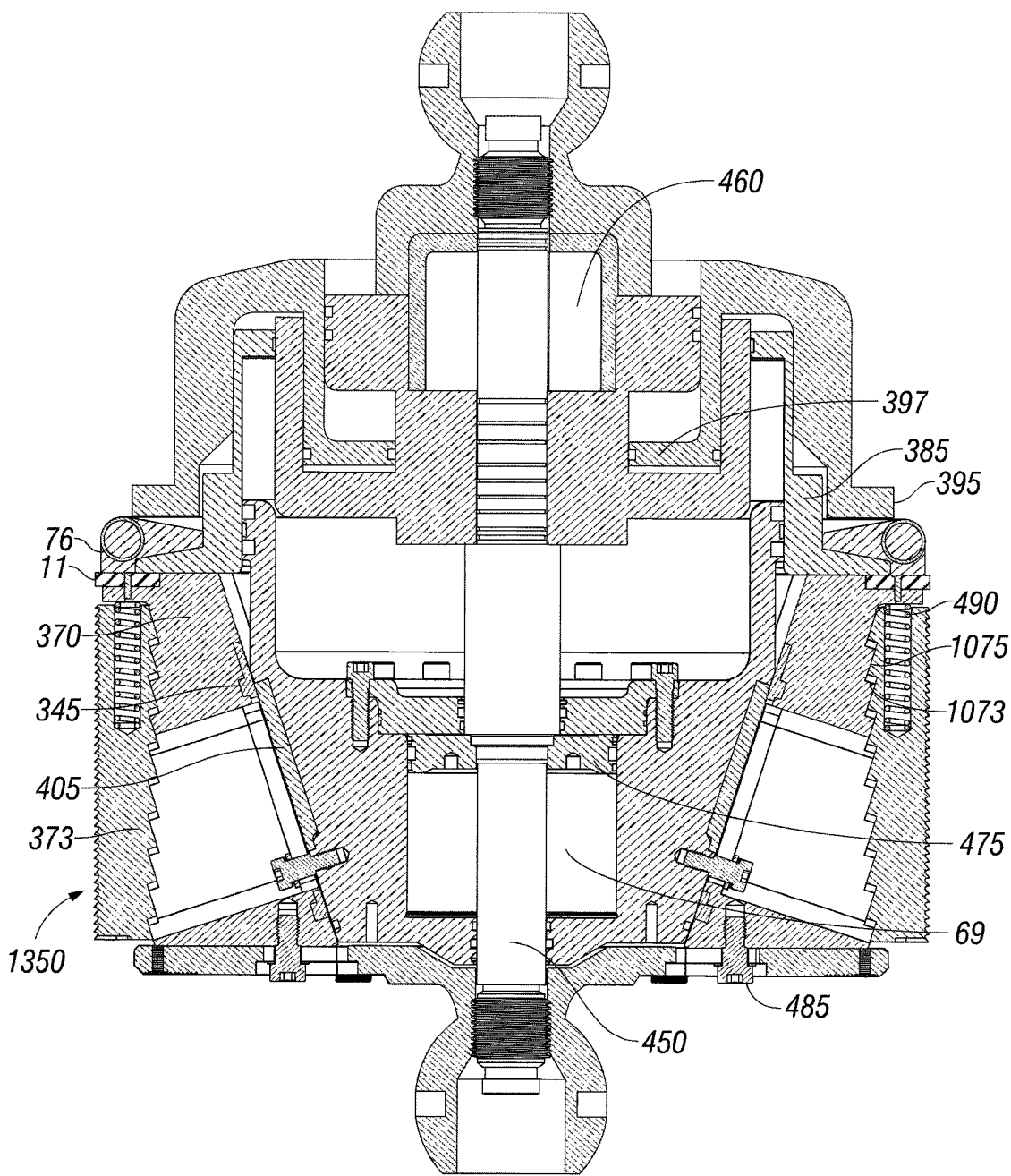
FIG. 11 depicts one embodiment of a side cut view of a staggered gripping wedge and sealing mechanism subassembly in activated phase.

FIG. 11 illustrates one embodiment of the present invention in which secondary wedges 370 and primary wedge 1070 (FIG. 9) are actuated therein causing grip unit 373 to extend. As illustrated hydraulic cylinder chamber 69 has moved significantly and substantially in relationship to piston 475 thereby causing primary wedge 1070 to extrude and push on secondary wedges 370 therein causing grip units 373 to extend.

As shown, in some embodiments, packer support is ring 11 radially extended or deployed outwards with secondary wedges 370 to substantially close off extrusion gaps behind the extended packer seal 76, inclusive of extrusion gaps between the plug body and the inner surface 4 of the pipeline and extrusion gaps between the extended secondary wedges 75a, b, c, d (FIG. 3A).

Figure 12B:
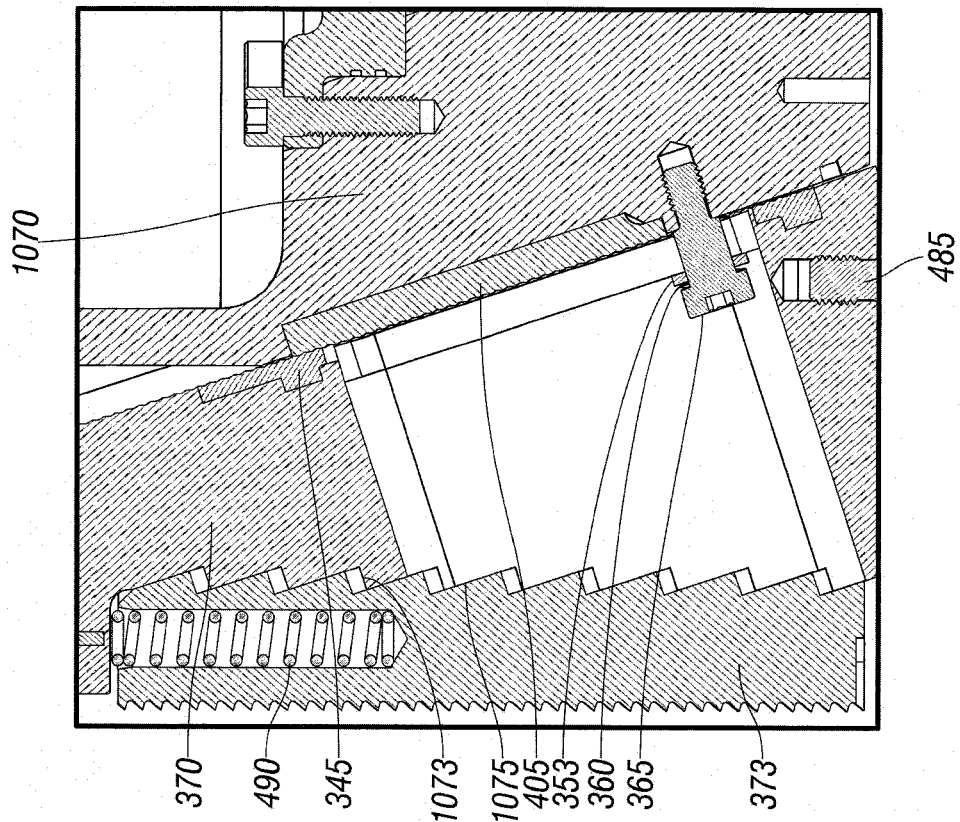
FIG. 12B depicts one embodiment of a close-up side cut view of a staggered gripping wedge mechanism subassembly in activated phase.
Figure 12A:
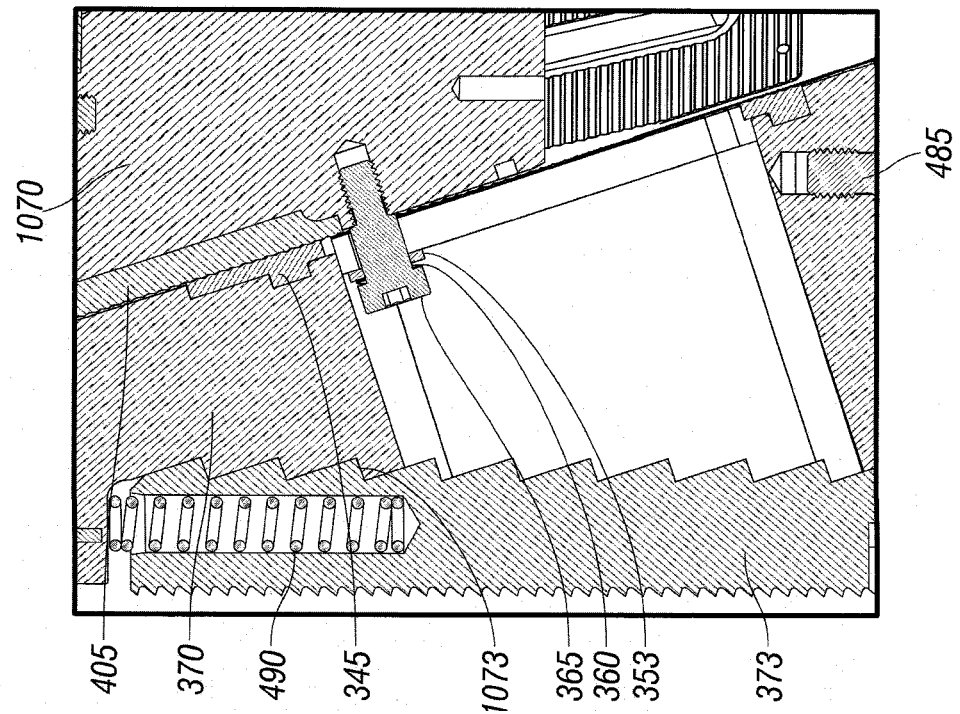
FIG. 12A depicts one embodiment of a close-up side cut view of a staggered gripping wedge mechanism subassembly in nonactivated phase.

FIG. 12A depicts one embodiment of a close-up, side-cut view of a staggered gripping wedge mechanism subassembly in nonactivated phase. As shown, shoulder bolt 365 is in nonengaged phase relative to secondary wedge 370. Shoulder bolt 365 combined with spring 360 and thrust washer 353 retain secondary wedge 370 in proximity to primary wedge 370 while allowing slidable engagement between the primary wedge 1070 and secondary wedge 370, and/or the primary wedge insert 405 and secondary wedge insert 345. Spring 490 interacts between secondary wedge 370 and grip unit 373 to maintain staggered contact between grip units 373 and secondary wedge stop surfaces 1073.

FIG. 12B depicts one embodiment of a close-up, side-cut view of a staggered gripping wedge mechanism subassembly in activated phase. As shown shoulder bolt 365 is in engaged phase relative to secondary wedge 370. Shoulder bolt 365 combined with spring 360 and thrust washer 353 retain secondary wedge 370 in proximity to primary wedge 370 while allowing slidable engagement between the primary wedge 1070 and secondary wedge 370. In activated phase, when the seal 76 is activated against the interior 4 of a pipeline 2, a differential pipeline pressure across the seal will cause a force to defeat spring 490 and allow slidable movement on surfaces 1075 further extending grip unit 373 and further increasing radial gripping force.

Figure 13:
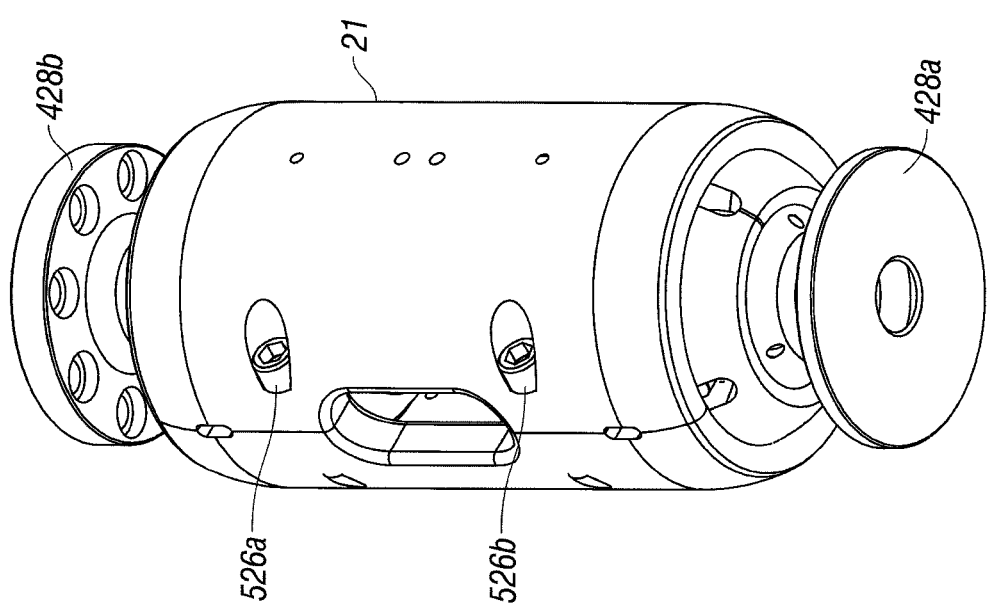
FIG. 13 depicts one embodiment of an assembled view of a ball joint assembly according to one or more embodiments.

FIG. 13 illustrates one embodiment of the ball joint assembly clamshell housing 21 for connecting gripper assemblies and/or control modules, or other pipeline pigs, or isolation tools, with other pipe pigging implements. As illustrated are ball adapter joints 428a which is the low-pressure side adaptor and 428b which is the high-pressure side adaptor for use in pipe pigging.

FIG. 14 shows one embodiment of a cross-sectional view of a ball joint assembly clamshell housing 21. As illustrated are ball joint interior conduits 28a and 28b. Also, shown are inner articulation stops, or pins, 525a-d. Further illustrated are clamshell assembly tension fasteners 526a-d.

Figure 15A:
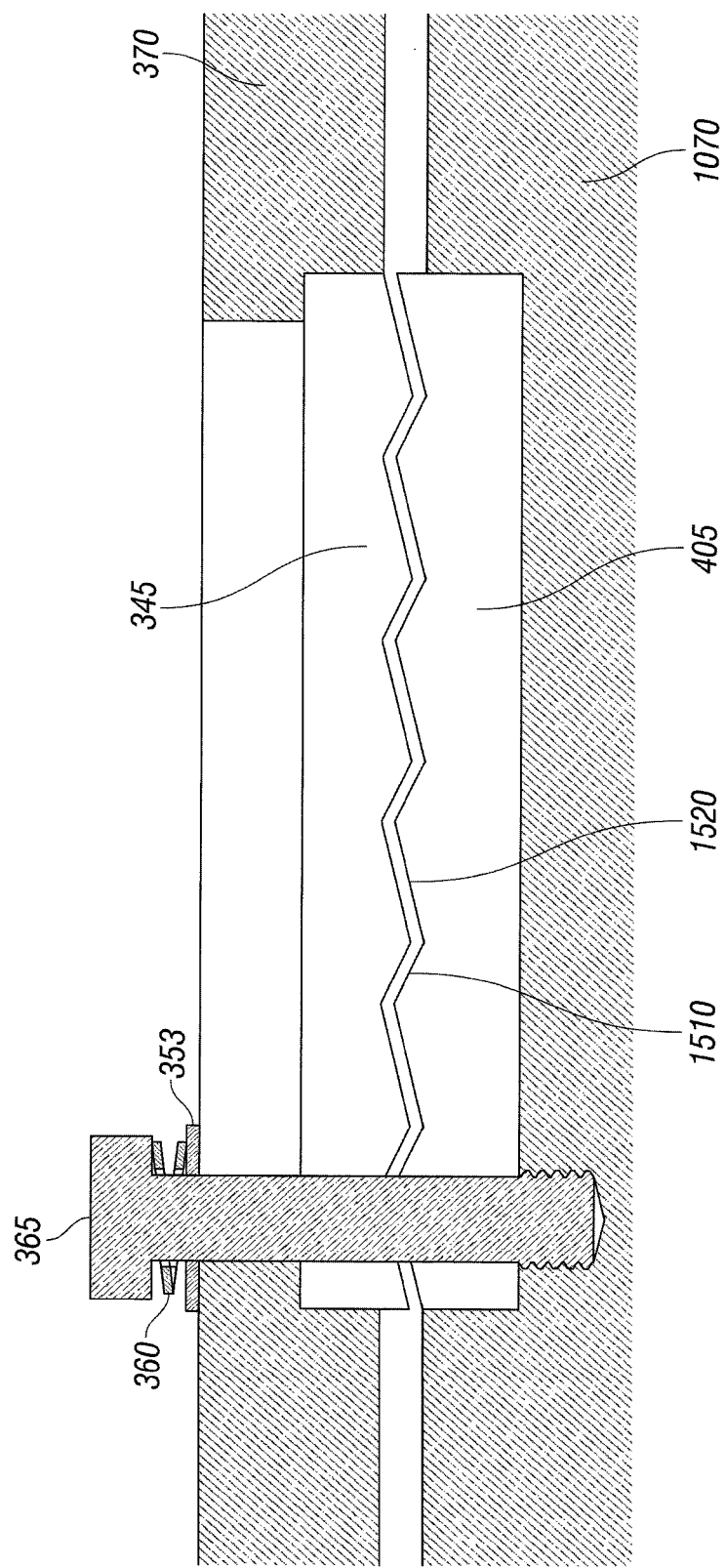
FIG. 15A depicts another embodiment of schematic view of the interactive interface surfaces of gripping wedge faces.

FIG. 15a depicts another embodiment of schematic view of the interactive surfaces of gripping wedge faces. Shoulder bolt 365 combined with spring 360 and thrust washer 353 retain secondary wedge 370 in proximity to primary wedge 1070 while allowing slidable engagement between the primary wedge 1070 and secondary wedge 370. Further shown is surface angle 1510 and surface angle 1520 as formed on both inserts 405 and 345. In several embodiments, surface angle 1510 is a steeper surface angle than 1520 in reference to the multi pressure head plug modules 300 longitudinal axis. As wedge inserts 405 and 345 are moved relative to each other, spring 360 retains the wedge inserts in proximity to each other, while allowing them to move closer and further from each other to traverse the ridged angles 1510 and 1520. Wedge inserts 405 and 345 are able to maneuver without any trauma or destruction to any wedge interfaces or wedges during operation.

In some embodiments, the surface of the wedge inserts 405 and 345 is made of a series of repeating steeper angles 1510 and shallower angles 1520, relative to the multi pressure head plug modules 300 longitudinal axis. These angles are selected such that during operation the wedge grip system comprised of the grip units 373, secondary wedges 370 and primary wedge 1070 become constrained by the gripping units 373 coming in contact with the pipeline interior diameter 4 the inserts 405 and 345 are in contact on the steeper angles 1510 the balance of forces will tend to cause the inserts to move relative to each other such that the units move "down" the steeper angle 1510 until they mesh completely and the units once again simultaneously contact on 1510 and 1520. When in operation the wedge grip system 373, 370 and 1070 become constrained by the pipeline 2 interior diameters, while the wedge inserts 405 and 345 are in contact on the shallower angle 1520, the balance of forces will tend to cause the inserts to move relative to each other such that the units move "up" the shallower angles 1520 until they mesh completely and the units once again simultaneously make contact on 1510 and 1520.

In some embodiments, the inventive system is used in a multi pressure head plug module 300. This invention facilitates the creation of a "short" plug by enabling the radial "stacking" of activation planes. Stacking of activation planes results in a device with multiple modes of instability. The present inventive system is flexible in that it activates based on encountering the interior diameter of the pipe 4. In many embodiments of the invention, the system does not have to be specifically tuned for each expected pipe 2 diameter.

Figure 15B:
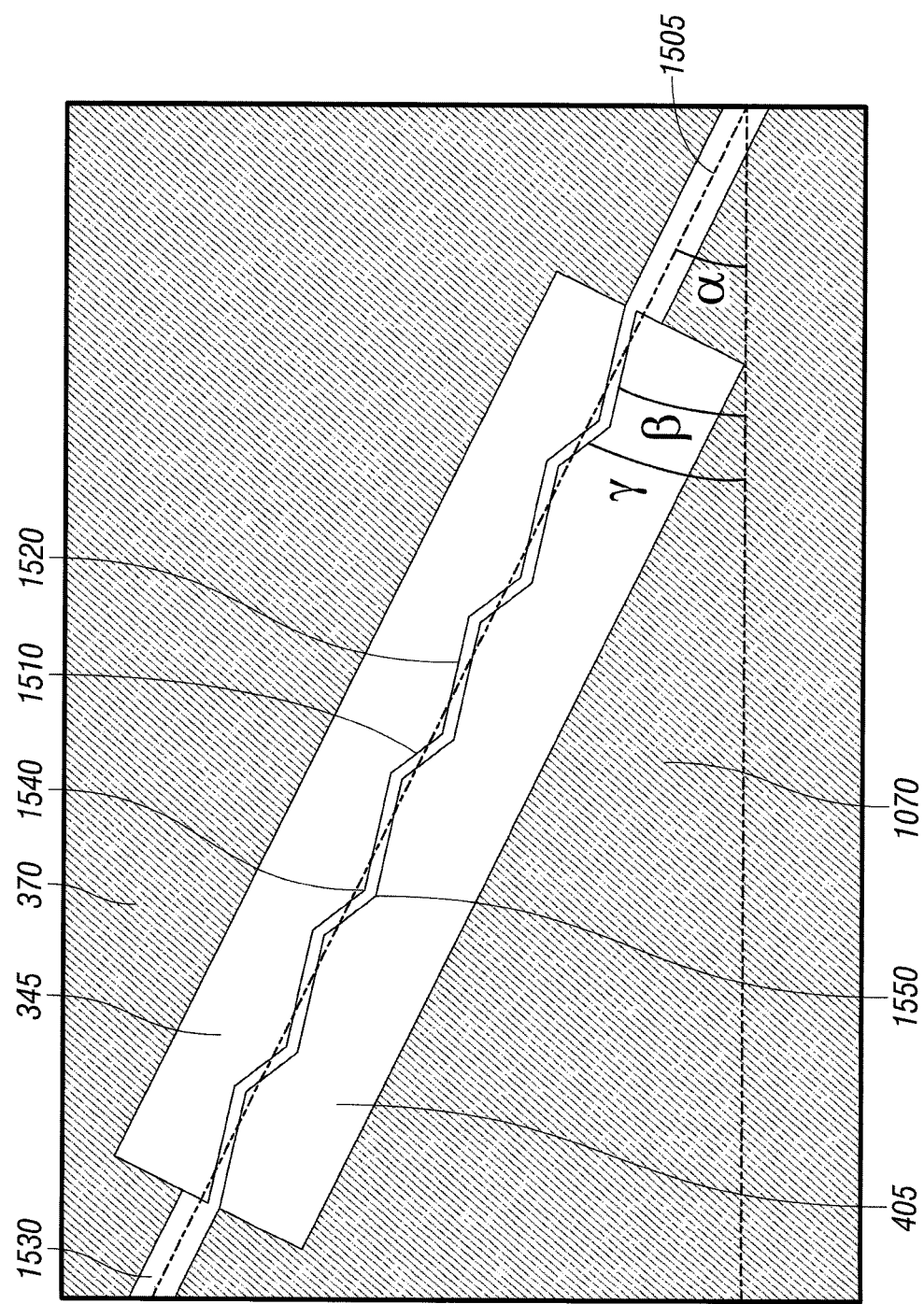
FIG. 15B depicts another embodiment of schematic view of the interactive interface surfaces of gripping wedge faces.

As shown in part in FIG. 15b, in some embodiments, the stacking of activation planes results in a gripping system with three mechanical layers. Starting from the axis of the plug they are the primary wedge 1070, secondary wedges 370 and grip units 373 (FIG. 9). The interface between the primary wedge 1070 and secondary wedge 370 is referred to as a first interface (interface 1) I1 (FIG. 12b). In some embodiments, the first interface I1 between the primary wedge 1070 and secondary wedge 370 is accomplished through inserts 405, 345. The interface between the secondary wedge 370 and grip unit 373 is referred to as a second interface (interface 2) I2 (FIG. 12b). The multiple modes of instability mean that the balance of input forces on the system could cause relative movement along the first interface I1, second interface I2 or a combination of movements in both of said interfaces. For each interface I1, I2, the relative movements could occur in either direction. The first interface I1 and the second interface I2 may be constructed at different angles relative to the multi pressure head plug module 300 longitudinal axis. The different relative angles of the first interface I1 and the second interface I2, combined with different input forces on the three-part wedge system (primary wedge 1070, secondary wedges 370 and grip units 373) will result in different behaviors of said three-part system. This behavior can be modeled using the engineering concept known as free body diagrams.

Specific input forces and boundary conditions, such as but not limited to; applied hydraulic force on primary wedge 1070, pipeline fluid hydraulic force on the multi pressure head plug module 300, pipeline interior diameter 4, contact angles between primary wedge 1070 and secondary wedge 370 at first interface I1 and contact angles between a secondary wedge 370 and grip unit 373 at the second interface I2, such that the behavior of the three-part system can be predicted. Further, one may change design and operation parameters under which they have control in order to achieve desired function of the three-part gripping system. For example, for otherwise similar design and operation parameters, changing the angle of the first interface I1 relative to the plug axis could result in different behavior, such as the secondary wedge moving "up" or "down" the primary wedge for said design and operation parameters. Furthermore, by carefully choosing all design and operation parameters, it may be possible to design a three-part system which is at an equilibrium state in its operable condition. However not all operational parameters are fully in control of the operator, such as minor fluctuations in the pressure of the pipeline fluid caused by changes in the ambient temperature. In some embodiments, the first interface 1 I1 may be formed by a plurality of pipe angled faces arranged around the primary wedge 1070 longitudinal axis. In some embodiments, the first interface I1 may be formed by a conical surface on the primary wedge 1070.

In some embodiments, the present inventive system seeks to overcome this limitation by designing a system which will take advantage of the multiple modes of instability present in the three-part wedge system. In some embodiments, the first interface I1 may be constructed with compound geometry which will take advantage of the multiple modes of instability in order to achieve a more functional three-part gripping system. In some embodiments, the first interface I1 may have a major plane of symmetry 1505 (substantially parallel to pipe angled face (also referred to as a pipe planar face) arranged at an angle $\alpha$ in relation to the longitudinal axis of the multi pressure head plug module 300. In some embodiments, a multiwedge feature deviating from the plane of symmetry 1505 is made of a plurality of repeating faces 1510 set at a steeper angle $\gamma$ and a plurality of repeating faces 1520 set at a shallower angle $\beta$ as related back to the multi pressure head plug module 300 longitudinal axis. Said repeating faces 1510 and 1520 present on both inserts 345, 405 in a substantially mating pattern. Said first interface I1 is allowed to slidably engage by means of a mechanism which allows the primary wedge 1070 and secondary wedge 370 (and in some embodiments, associated inserts 345, 405) to move relatively closer together and relatively further from each other while said first interface I1 remains in contact as the repeating faces 1510 and 1520 move over each other. This may be achieved in one embodiment by means of a shoulder bolt 365, spring 360 and thrust washer 353 moving slidably along a track or groove in secondary wedge 370. During most of the longitudinal travel along said first interface I1, only either the steep angle 1510 faces, or shallower angle faces 1520 will be in contact. At momentary periods of the slidable engagement of said first interface I1 the plurality of crests 1540 between the steeper angles 1510 and shallower angles 1520 will be fully seated in the bottom of the plurality of knees 1550 formed between the relatively steeper angles 1510 and shallower angles 1520 and the plurality of faces 1510 and 1520 will simultaneously be in contact with each other as illustrated in FIGS. 12a-b, and 15a-b. FIGS. 15a-b illustrate, for clarity, two surfaces of insert 345 and 405 not in contact although in operation they would be at least partially in contact.

These angles $\beta$, $\gamma$ are selected such that for certain boundary conditions, while said first interface I1 is in contact along either the steep faces 1510 or the shallower faces 1520, the balance of forces will drive relative movement between the primary wedge 1070 (and insert 405) and secondary wedge 370 (and insert 345) such that the plurality of crests 1540 move into the plurality of knees 1550. Thereafter under certain boundary conditions, the balance of forces will tend to keep the crests 1540 in the knees 1550 and effectively "lock" movement of said first interface I1 until the boundary conditions are removed or inventive system is deliberately de-activated.

In other embodiments, the repeating faces 1510 and 1520 could be replaced by a multitude of repeating faces at a multitude of angles. In other embodiments, the repeating faces 1510 and 1520 could be replaced by a continuous wave profile such as, but not limited to, a sinusoidal wave profile.

Figure 16:
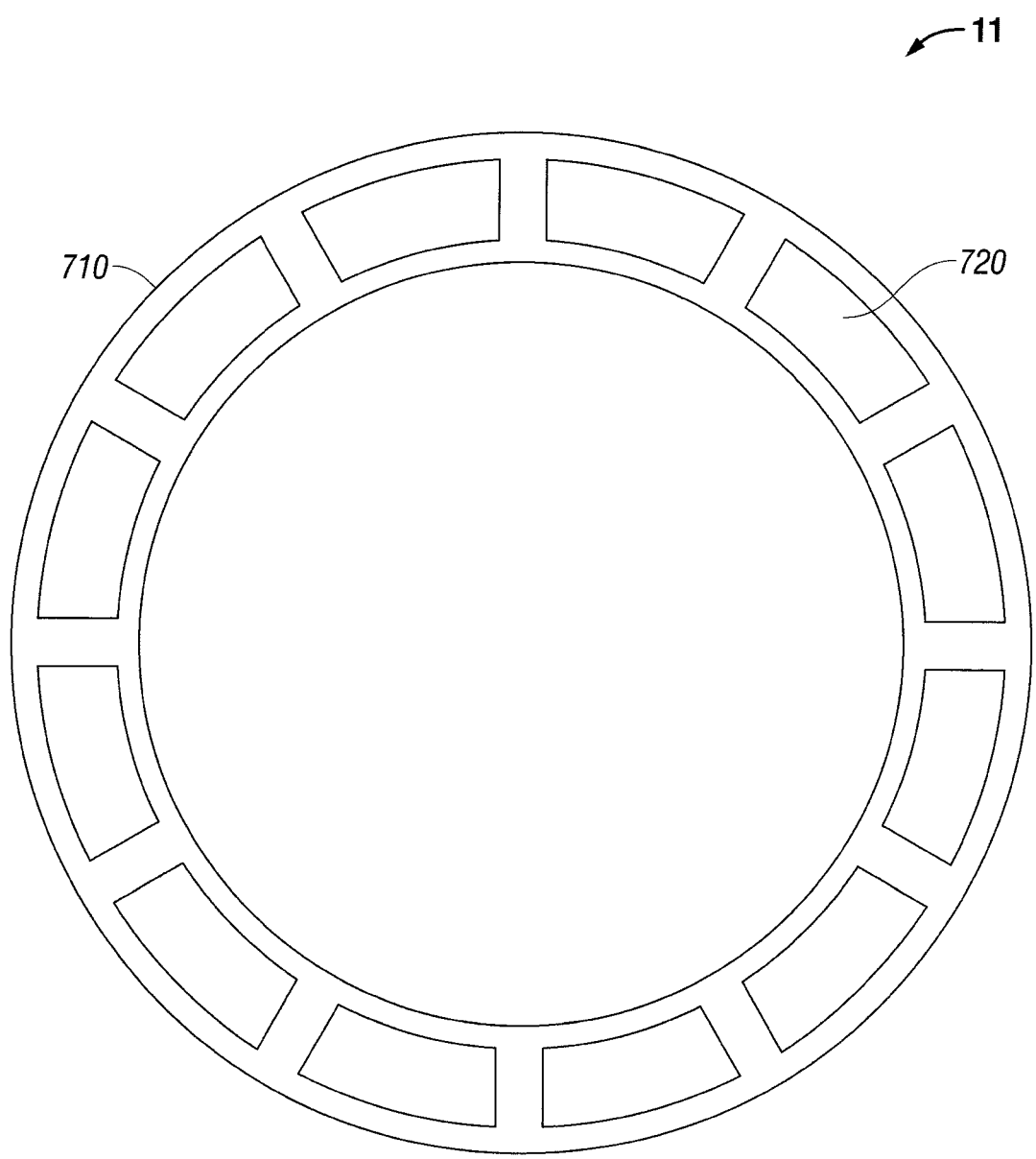
FIG. 16 depicts one embodiment of a packer support ring with inserts.

FIG. 16 illustrates one embodiment of the packer support ring 11 with metal inserts 720. As shown, in some embodiments, the packer support ring 11 can be rubber or another elastomeric material, and possibly thermoplastic material with flexibility and an ability to expand radially. In alternative embodiments, the packer support ring 11 can be of a composite construction including a strong, stiff material such as a stiff insert 720 and a compliant or elastomeric material 710 such as rubber. In some embodiments, the packer support rings 11 can be composed of stiff materials but allow for geometric expansion. In some embodiments, the stiff inserts 720 are encapsulated in the elastomeric material 710.

FIG. 17 depicts one embodiment of a hydrotest module configured as a gas phase fluid removal module.

In several embodiments, the present invention operates in the following manner: pressurized hydraulic fluid is sent from the control module 30 to hydraulic cylinder chamber 69 to actuate relative movement of piston 475 as is known in the art. The actuation of the piston 475 will cause movement of the primary wedge 1070. The movement of primary wedge 1070 will cause eventual interaction with secondary wedges 370 causing secondary wedges to push outwardly and to engage the grip units 373.

As shown, in some embodiments, the secondary wedge insert 405 will interact with the primary wedge insert 345, therein causing locking or substantially restricting relative movement of first interface I1 to allow for the improved gripping of interior of a pipe when in use. Secondary wedge inserts 405 are preferably maintained by spring 360 therein allowing secondary wedge interface 405 faces to be able to maneuver without any trauma or destruction to any wedge interfaces 405 or 345 or wedges 1070, 370, or 373 during operation.

In some embodiments, during non-operation or not activation cycle, primary wedge 1070 and secondary wedges 370 are in position such that the multi pressure head plug module 300 can be maneuvered into a pipe, stored, or kept in not activated form. In this form, the grip units are substantially flush with the body of the multi pressure head plug module 300. In some embodiments, during activation, the grip units 373 will actually extend from the body of the multi pressure head plug module 300 and eventually contact pipe interior wall 4 (or just reach full extension) such that they will interface and mechanically engage said pipe interior wall 4. In such situations, the primary wedge 1070 has engaged secondary wedges 370 causing them to extend into secondary wedges 370 extend grip units 373. The secondary wedge inserts 405 and 345 preferably also assist in wedge engagement and allow further contact with staggered tooth engagement of the faces on wedge inserts 405 and 345, thereby increasing contact and decreasing chance of dislodging grip unit 373 while engaged with an interior pipe wall 4.

In several embodiments, the present invention operates in the following manner: pressurized hydraulic fluid is sent from the control module 30 to act on packer activation piston 397 as is known in the art. The actuation of the piston 397 will cause movement of the high-pressure packer ring 395 and compress packer seal 76 until it extends radially outward to engage the pipe interior wall 4.

In some embodiments, the hydrotest works in the following manner. The hydrotest module 40 is utilized in a pipeline 2 containing a fluid between two multi pressure head plug modules 10 or 300. The multi pressure head plug modules are actuated to seal off or isolate a segment of pipeline 2. Next the hydrotest module inflatable bellows 42 activated to displace fluid, such as water, thereby increasing pressure applied to the interior of the pipeline 2.

As shown in FIGS. 3A, 3B, 9, 10 and 11, in some embodiments of the present invention, the packer ring and activation system utilizes a packer, a packer support ring, a primary wedge, a plurality of secondary wedges and a plurality of secondary wedge inserts.

As shown in FIGS. 3A, 3B, 9, 10 and 11, in some embodiments of the present invention, the primary wedge further utilizes a plurality of pipe angled faces and a pipe parallel face.

As shown in FIGS. 3A, 3B, 9, 10 and 11, in some embodiments of the present invention, the plurality of secondary wedges utilize a primary wedge interface with and a grip unit, wherein the grip unit interface has a series of shallow and steep cut outs in a staggered tooth configuration; the secondary wedges further have a pipe perpendicular face, a plurality of grip units; these grip units utilize a secondary wedge interface and a tubular contact interface.

As shown in FIGS. 3A, 3B, 9, 10 and 11, in some embodiments of the present invention the secondary wedge interface further contains a series of shallow and steep cut outs in a staggered tooth configuration with a tubular contact face further with a series of radial grips;

As shown in FIGS. 3A, 3B, 9, 10 and 11, in some embodiments of the present invention, the plurality of primary wedge inserts have a staggered angle tooth configuration;

As shown in FIGS. 3A, 3B, 9, 10 and 11, in some embodiments of the present invention, a plurality of secondary wedge inserts with a staggered angle tooth configuration; wherein said packer is in mechanical communication with said secondary wedges pipe perpendicular face; said primary wedge pipe angled face is in mechanical communication with said primary wedge insert; said primary wedge insert is in mechanical communication with said secondary wedge insert; said secondary wedge insert is in mechanical communication with said secondary wedge interface; and said secondary wedge grip unit interface face is in mechanical communication with said grip unit.

As shown in FIGS. 3A, 3B, 9, 10 and 11, in some embodiments of the present invention, the packer ring and activation system contains a packer support ring comprised of at least one segment of a relatively stiff material encapsulated in relatively less stiff material.

As shown in FIGS. 3A, 3B, 9, 10 and 11, in some embodiments of the present invention, the packer ring and activation system utilizes a packer, a packer support ring, a primary wedge, a plurality of secondary wedges and a plurality of secondary wedge inserts.

As shown in FIGS. 3A, 3B, 9, 10 and 11, in some embodiments of the present invention, the primary wedge further utilizes a plurality of pipe angled faces and a pipe parallel face.

As shown in FIGS. 3A, 3B, 9, 10 and 11, in some embodiments of the present invention, the plurality of secondary wedges utilize a primary wedge interface with a grip unit, wherein the grip unit interface has a tubular contact face with a series of radial grips wherein the packer is in mechanical communication with the secondary wedges pipe perpendicular face, the primary wedge pipe angled face is in mechanical communication with the secondary wedge and the secondary wedge is in mechanical communication with the grip unit.

As shown in FIGS. 3A, 3B, 9, 10 and 11, in some embodiments of the present invention, the packer ring and activation system contains a packer support ring comprised of at least one segment of a relatively stiff material encapsulated in a relatively less stiff material which is configured to deploy, expand or extend radially toward the inner wall of a pipeline and partially or completely bridge one or all of the plurality of extrusion gaps and/or a plurality of unsupported gaps between the plurality of the radially expanding grips.

As shown in FIGS. 3A, 3B, 9, 10 and 11, in some embodiments of the present invention, the packer ring and activation system contains an activation system with a packer, a plurality of secondary wedges in mechanical communication with the packer support ring wherein the packer and packer support ring are expanded radially toward the pipeline inner wall by expansion of the secondary wedges.

As shown in FIGS. 3A, 3B, 9, 10 and 11, in some embodiments of the present invention, the packer ring and activation system contains a plurality of primary wedges with inserts with staggered angle tooth configuration, a plurality of secondary wedges with inserts with staggered angle tooth configuration; wherein, the packer support ring is in mechanical communication with the secondary wedges, the primary wedge pipe angled face is in mechanical communication with the primary wedge insert, the primary wedge insert is in mechanical communication with the secondary wedge insert, and the secondary wedge insert is in mechanical communication with the secondary wedge interface; the secondary wedges further have a pipe perpendicular face and a plurality of grip units which utilize a secondary wedge interface and a tubular contact interface.

As shown in FIGS. 3A, 3B, 9, 10 and 11, in some embodiments of the present invention, the packer ring and activation system contains a hydraulic cylinder which is pressurized to drive the primary wedges into sliding contact with the secondary wedges, expanding the packer support ring toward the pipeline inner wall.

As shown in FIGS. 3A, 3B, 9, 10 and 11, in some embodiments of the present invention, the primary wedge insert and secondary wedge insert contact surfaces are set at angles to promote crests of one insert to move into the knee of the mating staggered angle tooth insert when the grip units contact a tubular such as the inner pipeline wall such as to prevent further relative movement between the primary wedge insert and the secondary wedge insert.

As shown in FIGS. 3A, 3B, 9, 10 and 11, in some embodiments of the present invention, the packer ring and activation system contains a packer and a plurality of secondary wedges which are in mechanical communication with the packer support ring such that the packer support ring is expanded radially toward the pipeline inner wall by the expansion of the secondary wedges.

As shown in FIGS. 3A, 3B, 9, 10 and 11, in some embodiments of the present invention, the packer ring and activation system contains a plurality of primary wedges with inserts with a staggered angle tooth configuration, a plurality of secondary wedges with inserts with a staggered angle tooth configuration; wherein the packer support ring is in mechanical communication with said secondary wedges, the primary wedge pipe angled face is in mechanical communication with the primary wedge insert, the primary wedge insert is in mechanical communication with the secondary wedge insert and the secondary wedge insert is in mechanical communication with the secondary wedge interface.

As shown in FIGS. 3A, 3B, 9, 10 and 11, in some embodiments of the present invention, the packer and activation system utilizes a hydraulic cylinder; wherein, the hydraulic cylinder is pressurized to the drive the primary wedges into sliding contact with the secondary wedges expanding the packer support ring toward the pipeline inner wall.

As shown in FIGS. 3A, 3B, 9, 10 and 11, in some embodiments of the present invention, the packer ring and activation system contains a primary wedge insert and secondary wedge insert contact surfaces set at angles to promote crests of one insert to move into the knees of the mating staggered tooth insert when the grip units contact a tubular such as the pipeline inner wall such as to prevent further relative movement between the primary wedge insert and the secondary wedge insert.

As shown in FIGS. 3A, 3B, 9, 10 and 11, in some embodiments, the present invention is a packer ring and activation system utilizing a hydraulic cylinder; wherein the hydraulic cylinder is pressurized to drive the primary wedges into sliding contact with the secondary wedges and expanding the packer support ring toward said pipeline inner wall.

While these embodiments have been described with emphasis on the embodiments, it should be understood that within the scope of the appended claims, the embodiments might be practiced other than as specifically described herein.

While preferred embodiments have been shown, and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, the relative dimensions of various parts, the materials from which the various parts are made, and other parameters can be varied. Accordingly, it is intended that the following claims be interpreted to embrace all such variations and modifications.

What is claimed is:

1. A packer ring and activation system comprising:
   a packer;
   a packer support ring;
   a primary wedge;
   said primary wedge further comprising a plurality of pipe angled faces and a pipe parallel face;
   a plurality of secondary wedges;
      said secondary wedges further comprising a primary wedge interface face and a grip unit interface face;
      said grip unit interface face further comprising a series of shallow and steep cut outs in a staggered tooth configuration; and
      said secondary wedges further comprising a pipe perpendicular face;
   a plurality of grip units;
   said grip units further comprising a secondary wedge interface face and a tubular contact interface face;
      said secondary wedge interface further comprising a series of shallow and steep cut outs in a staggered tooth configuration;
      said tubular contact face further comprising a series of radial grips;
   a plurality of primary wedge inserts with a staggered angle tooth configuration;
   a plurality of secondary wedge inserts with a staggered angle tooth configuration;
   wherein;
      said packer is in mechanical communication with said secondary wedges pipe perpendicular face; said primary wedge pipe angled face is in mechanical communication with said primary wedge insert; said primary wedge insert is in mechanical communication with said secondary wedge insert; said secondary wedge insert is in mechanical communication with said secondary wedge interface; and said secondary wedge grip unit interface face is in mechanical communication with said grip unit.

2. The packer ring and activation system of claim 1 further comprising:
   said packer support ring is comprised of at least one segment of a relatively stiff material encapsulated in relatively less stiff material.

3. The packer ring and activation system of claim 1 further comprising:
   a hydraulic cylinder; wherein, said hydraulic cylinder is pressurized to drive the primary wedges into sliding contact with the secondary wedges and expanding the packer support ring toward said pipeline inner wall.

4. The packer ring and activation system of claim 3 further comprising:
   said primary wedge insert and secondary wedge insert contact surfaces set at angles to promote crests of said primary wedge insert staggered angle tooth configuration to move into knees of said secondary wedge insert staggered tooth configuration the mating staggered angle tooth inserts when said grip units contact a tubular such as the pipe wall such as to prevent further relative movement between said primary wedge insert and said secondary wedge insert.

5. A packer ring and activation system comprising:
   a packer;
   a packer support ring;
   a primary wedge;
      said primary wedge further comprising a plurality of pipe angled faces and a pipe parallel face;
   a plurality of secondary wedges;
      said secondary wedges further comprising a primary wedge interface face and a grip unit interface face;
      said grip unit interface face further comprising a series of shallow and steep cut outs in a staggered tooth configuration; and
      said secondary wedges further comprising a pipe perpendicular face; a grip unit;
      said grip units further comprising a tubular contact interface face;
      said tubular contact face further comprising a series of radial grips; wherein
      said packer is in mechanical communication with said secondary wedges pipe perpendicular face; said primary wedge pipe angled face is in mechanical communication with said secondary wedge and secondary wedge is in mechanical communication with said grip unit.

6. The packer ring and activation system of claim 5 further comprising:
   said secondary wedges are in mechanical communication with the packer support ring;

wherein the packer support ring is expanded radially toward the pipeline inner wall by the expansion of the secondary wedges.

7. The packer ring and activation system of claim 6 further comprising:
a plurality of primary wedges further comprising inserts with a staggered angle tooth configuration;
said plurality of secondary wedges further comprising inserts with a staggered angle tooth configuration;
wherein said packer support ring is in mechanical communication with said secondary wedges; said primary wedge pipe angled face is in mechanical communication with said primary wedge insert; said primary wedge insert is in mechanical communication with said secondary wedge insert; said secondary wedge insert is in mechanical communication with said secondary wedge interface.

8. A packer ring and activation system comprising:
a packer support ring configured to deploy, expand or extend radially toward a pipeline inner wall and partially or completely bridge one or both of a plurality of extrusion gaps and/or a plurality of unsupported gaps between a plurality of said radially expanding grips, said packer support ring is comprised of at least one segment of a relatively stiff material encapsulated in relatively less stiff material;
an activation system comprising;
a packer;
a plurality of secondary wedges;
said plurality of secondary wedges are in mechanical communication with the packer support ring;
wherein the packer support ring is expanded radially toward said pipeline inner wall by the expansion of the plurality of secondary wedges.

9. The packer ring and activation system of claim 8 further comprising:
a plurality of primary wedges further comprising inserts with a staggered angle tooth configuration and a pipe angled face;
said plurality of secondary wedges further comprising inserts with a staggered angle tooth configuration and a secondary wedge interface;
wherein said packer support ring is in mechanical communication with said plurality of secondary wedges;
said primary wedge pipe angled face is in mechanical communication with said primary wedge insert;
said primary wedge insert is in mechanical communication with said secondary wedge insert;
said secondary wedge insert is in mechanical communication with said secondary wedge interface.

10. The packer ring and activation system of claim 9 further comprising:
a hydraulic cylinder; wherein,
said hydraulic cylinder is pressurized to drive the primary wedges into sliding contact with the secondary wedges and expanding the packer support ring toward said pipeline inner wall.

11. The packer ring and activation system of claim 10 further comprising:
a plurality of grip units comprising a secondary wedge interface face and a tubular contact interface face, wherein said secondary wedge interface face of said grip unit is in mechanical communication a grip unit interface face of said plurality of secondary wedge insert;
said primary wedge insert and secondary wedge insert contact surfaces set at angles to promote crests of one insert to move into knees of the other staggered angle tooth insert when said grip units contact a tubular such as the pipe wall such as to prevent further relative movement between said primary wedge insert and said secondary wedge insert.

* * * * *